(12) United States Patent
Zhao

(10) Patent No.: US 12,177,742 B2
(45) Date of Patent: Dec. 24, 2024

(54) METHOD FOR ACQUIRING TARGET IDENTIFICATION, SERVICE ENTITY, ELECTRONIC APPARATUS AND STORAGE MEDIUM

(71) Applicants: BEIJING BOE TECHNOLOGY DEVELOPMENT CO., LTD., Beijing (CN); BOE TECHNOLOGY GROUP CO., LTD., Beijing (CN)

(72) Inventor: Junjie Zhao, Beijing (CN)

(73) Assignee: BEIJING BOE TECHNOLOGY DEVELOPMENT CO., LTD., Beijing (CN)

(*) Notice: Subject to any disclaimer, the term of this patent is extended or adjusted under 35 U.S.C. 154(b) by 236 days.

(21) Appl. No.: 17/642,309

(22) PCT Filed: Sep. 14, 2020

(86) PCT No.: PCT/CN2020/114954
§ 371 (c)(1),
(2) Date: Mar. 11, 2022

(87) PCT Pub. No.: WO2021/052276
PCT Pub. Date: Mar. 25, 2021

(65) Prior Publication Data
US 2022/0345851 A1  Oct. 27, 2022

(30) Foreign Application Priority Data

Sep. 16, 2019  (CN) .......................... 201910870805.4

(51) Int. Cl.
*H04W 4/029* (2018.01)
*H04W 72/51* (2023.01)

(52) U.S. Cl.
CPC ........... *H04W 4/029* (2018.02); *H04W 72/51* (2023.01)

(58) Field of Classification Search
CPC ..... H04W 4/029; H04W 72/51; H04W 12/06; H04W 4/022; H04W 4/70; H04W 4/80;
(Continued)

(56) References Cited

U.S. PATENT DOCUMENTS

2015/0074004 A1   3/2015  Song
2017/0039631 A1   2/2017  Luke et al.
(Continued)

FOREIGN PATENT DOCUMENTS

CN   107293003 A   10/2017
CN   107578505 A    1/2018
(Continued)

OTHER PUBLICATIONS

Extended European search report issued by the European Patent Office for the corresponding Patent Application No. 20865469.9. The EESR has an issue date of Jul. 10, 2023.
(Continued)

*Primary Examiner* — Kenneth T Lam
(74) *Attorney, Agent, or Firm* — Dilworth & Barrese, LLP.; Michael J. Musella, Esq.

(57) ABSTRACT

A method for acquiring a target identification, a service entity, an electronic apparatus, and a storage medium are provided. The method for acquiring the target identification includes: receiving a first request; and determining the target identification according to the location information. The first request is sent by a requester, and the first request includes location information of the requester.

14 Claims, 19 Drawing Sheets

(58) Field of Classification Search
CPC . H04W 4/025; G06Q 10/063; G06Q 30/0645; G06Q 50/40; H04L 65/1073; H04L 65/1069; H04L 67/10; H04L 67/52; H04L 67/125; H04L 67/133; H04M 1/72412
See application file for complete search history.

(56) References Cited

U.S. PATENT DOCUMENTS

| | | | | |
|---|---|---|---|---|
| 2017/0081796 | A1* | 3/2017 | Belveal | D06F 33/00 |
| 2018/0174265 | A1* | 6/2018 | Liu | G06Q 30/0645 |
| 2019/0265868 | A1* | 8/2019 | Penilla | H04L 63/083 |
| 2022/0262253 | A1* | 8/2022 | Wu | G08G 1/167 |

FOREIGN PATENT DOCUMENTS

| | | |
|---|---|---|
| CN | 108022341 A | 5/2018 |
| CN | 108734836 A | 11/2018 |
| CN | 109166214 A | 1/2019 |
| CN | 109615734 A | 4/2019 |
| JP | 2014209294 A | 11/2014 |
| JP | 6444559 B1 | 12/2018 |
| JP | 2019074930 A | 5/2019 |
| JP | 2019075100 A | 5/2019 |

OTHER PUBLICATIONS

First Office Action issued by the Chinese Patent Office in the priority Chinese application No. 201910870805.4 which has an issue date of Apr. 20, 2023.
Japanese Office Action issued by the Japanese Patent Office for the corresponding Patent Application No. 2022-516361. The Office Action has a mailing date of Oct. 28, 2024.

* cited by examiner

METHOD FOR ACQUIRING TARGET IDENTIFICATION, SERVICE ENTITY, ELECTRONIC APPARATUS AND STORAGE MEDIUM

The present application claims the priority of Chinese patent application No. 201910870805.4, filed on Sep. 16, 2019, the entire disclosure of which is incorporated herein by reference as part of the disclosure of this application.

TECHNICAL FIELD

Embodiments of the present disclosure relate to a method for acquiring a target identification, a service entity, an application entity, an electronic apparatus, and a storage medium.

BACKGROUND

With development of information technologies, especially Internet technologies, the Internet of Things technology for implementing informatization, remote management control and intellectualization has been gradually getting matured. The Internet of Things uses communication technologies such as local area networks, wide area networks, the Internet, and wireless Internet to connect sensors, controllers, machines, people, and items, etc. in new ways, so as to form connections between people and things, and between things and things. With rapid development of the Internet of Things technology in various application fields, more and more devices are coupled to the Internet of Things, and various new application fields such as smart home, smart transportation and smart health have emerged.

SUMMARY

At least one embodiment of the present disclosure provides a method for acquiring a target identification, and the method comprises: receiving a first request, where the first request is sent by a requester, and the first request comprises location information of the requester; and determining the target identification according to the location information.

For example, in the method provided by an embodiment of the present disclosure, determining the target identification according to the location information comprises: determining at least one candidate resource according to the location information; and determining a target resource based on the at least one candidate resource, and determining an identification of the target resource as the target identification.

For example, in the method provided by an embodiment of the present disclosure, determining the at least one candidate resource according to the location information comprises: calculating a target region according to the location information; and determining at least one registered resource in the target region as the candidate resource.

For example, in the method provided by an embodiment of the present disclosure, the target region comprises a plurality of target coordinate points, and distances between the plurality of target coordinate points and a coordinate point corresponding to the location information are less than or equal to a first threshold.

For example, in the method provided by an embodiment of the present disclosure, the at least one candidate resource comprises a single candidate resource, determining the target resource based on the at least one candidate resource, and determining the identification of the target resource as the target identification, comprises: determining the single candidate resource as the target resource, and determining the identification of the target resource as the target identification.

For example, in the method provided by an embodiment of the present disclosure, the at least one candidate resource comprises a single candidate resource, and the first request further comprises a pre-judgment identification that is a portion identification relative to the target identification. Determining the target resource based on the at least one candidate resource, and determining the identification of the target resource as the target identification, comprises: calculating a matching degree between an identification of the candidate resource and the pre-judgment identification; and in the case where the matching degree is greater than or equal to a second threshold, determining the candidate resource as the target resource, and determining the identification of the target resource as the target identification.

For example, in the method provided by an embodiment of the present disclosure, the at least one candidate resource comprises a plurality of candidate resources. Determining the target resource based on the at least one candidate resource, and determining the identification of the target resource as the target identification, comprises: sending identifications of the plurality of candidate resources to the requester; and receiving the target identification sent by the requester.

For example, in the method provided by an embodiment of the present disclosure, the at least one candidate resource comprises a plurality of candidate resources. Determining the target resource based on the at least one candidate resource, and determining the identification of the target resource as the target identification, comprises: sending identifications of the plurality of candidate resources to the requester; receiving a plurality of pieces of relative location information sent by the requester and corresponding to the plurality of candidate resources; and determining the target resource based on the plurality of pieces of relative location information, and determining the identification of the target resource as the target identification.

For example, in the method provided by an embodiment of the present disclosure, the at least one candidate resource comprises a plurality of candidate resources, and the first request further comprises a pre-judgment identification that is a portion identification relative to the target identification. Determining the target resource based on the at least one candidate resource, and determining the identification of the target resource as the target identification, comprises: calculating matching degrees between identifications of the plurality of candidate resources and the pre-judgment identification to obtain a plurality of matching degrees; and determining the target resource based on the plurality of matching degrees, and determining the identification of the target resource as the target identification.

For example, in the method provided by an embodiment of the present disclosure, determining the target resource based on the plurality of matching degrees, and determining the identification of the target resource as the target identification, comprises: in the case where there is at least one matching degree greater than or equal to a second threshold among the plurality of matching degrees, determining a candidate resource corresponding to a greatest matching degree among the at least one matching degree greater than or equal to the second threshold as the target resource, and determining the identification of the target resource as the target identification.

For example, in the method provided by an embodiment of the present disclosure, determining the target resource based on the plurality of matching degrees, and determining the identification of the target resource as the target identification, comprises: in the case where the plurality of matching degrees are all less than a second threshold, sending the identifications of the plurality of candidate resources to the requester; and receiving the target identification sent by the requester.

For example, in the method provided by an embodiment of the present disclosure, determining the target resource based on the plurality of matching degrees, and determining the identification of the target resource as the target identification, comprises: in the case where the plurality of matching degrees are all less than a second threshold, sending the identifications of the plurality of candidate resources to the requester; receiving a plurality of pieces of relative location information sent by the requester and corresponding to the plurality of candidate resources; and determining the target resource based on the plurality of pieces of relative location information, and determining the identification of the target resource as the target identification.

For example, in the method provided by an embodiment of the present disclosure, the relative location information comprises at least one of a relative distance of the requester and the candidate resource, an angle of arrival, or an angle of departure.

At least one embodiment of the present disclosure further provides a service entity, which comprises: a request receiving unit, configured to receive a first request, in which the first request is sent by a requester, and the first request comprises location information of the requester; and an identification determining unit, configured to determine a target identification according to the location information.

At least one embodiment of the present disclosure further provides a method for acquiring a target identification, and the method comprises: sending a first request. The first request is sent by a requester, the first request comprises location information of the requester, and the location information is used to determine the target identification.

For example, the method provided by an embodiment of the present disclosure further comprises: receiving identifications of a plurality of candidate resources; calculating a plurality of pieces of relative location information of the requester and the plurality of candidate resources; and determining a target resource according to the plurality of pieces of relative location information, and determining an identification of the target resource as the target identification, or, sending the plurality of pieces of relative location information.

For example, in the method provided by an embodiment of the present disclosure, the relative location information comprises at least one of a relative distance of the requester and the candidate resource, an angle of arrival, or an angle of departure.

For example, in the method provided by an embodiment of the present disclosure, after determining the target resource according to the plurality of pieces of relative location information and determining the identification of the target resource as the target identification, the method further comprises: sending a second request according to the target identification.

For example, in the method provided by an embodiment of the present disclosure, after sending the plurality of pieces of relative location information, the method further comprises: receiving the target identification; and sending a second request according to the target identification.

For example, the method provided by an embodiment of the present disclosure further comprises: receiving identifications of a plurality of candidate resources; and determining a target resource among the plurality of candidate resources according to a preset rule, and determining an identification of the target resource as the target identification.

For example, in the method provided by an embodiment of the present disclosure, the first request further comprises a pre-judgment identification that is a portion identification relative to the target identification.

At least one embodiment of the present disclosure further provides an application entity, which comprises a request sending unit. The request sending unit is configured to send a first request, the first request comprises location information of the application entity, and the location information is used to determine a target identification.

At least one embodiment of the present disclosure further provides an electronic apparatus, which comprises: a processor; and a memory, comprising one or more computer program modules. The one or more computer program modules are stored in the memory and configured to be executed by the processor, and the one or more computer program modules comprise instructions for implementing the method for acquiring the target identification according to any one of embodiments of the present disclosure.

At least one embodiment of the present disclosure further provides a storage medium, which is configured to store non-transitory computer-readable instructions. The non-transitory computer-readable instructions, when executed by a computer, implement the method for acquiring the target identification according to any one of embodiments of the present disclosure.

BRIEF DESCRIPTION OF THE DRAWINGS

In order to clearly illustrate the technical solutions of the embodiments of the present disclosure, the drawings of the embodiments will be briefly described in the following. It is obvious that the described drawings are only related to some embodiments of the present disclosure and thus are not limitative to the present disclosure.

DETAILED DESCRIPTION

Figure 1:
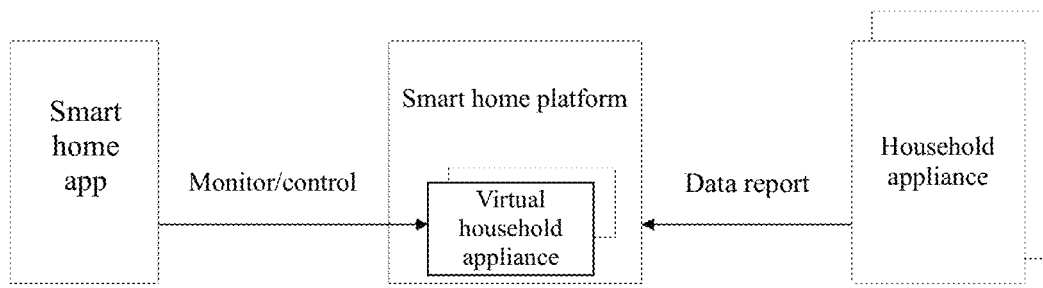
FIG. 1 is a schematic diagram of an interaction mode of the Internet of Things.

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present invention belongs. The terms "first," "second," etc., which are used in the description and the claims of the present application for invention, are not intended to indicate any sequence, amount or importance, but distinguish various components. Also, the terms such as "a," "an," etc., are not intended to limit the amount, but indicate the existence of at least one. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the absolute position of the object which is described is changed, the relative position relationship may be changed accordingly.

With development of the Internet of Things technologies, more and more terminal devices access to the Internet of Things (IoT) platform, for example, shared bicycles, household appliances, smoke alarms, fire alarms, manhole cover movement sensors, etc. The IoT platform may be, for example, a service entity, for example, a general service entity. The general service entity may be implemented as a software module or an application program of a service platform (e.g., a server); and the service platform may be local or remote (e.g., cloud). The terminal device can establish connection with the general service entity by sending registration information to the general service entity. Thus, the general service entity can manage the accessing terminal device. For example, the terminal device may be represented as an application entity; after the application entity accesses the general service entity, the application entity may perform operations such as data transmission and instruction interaction with the general service entity.

It should be noted that, the application entity described herein may be a terminal device, or may also be a software module, an application program, etc. in the terminal device, which is not limited by the embodiments of the present disclosure.

For example, RESTFUL is a commonly used design style and developing mode of web applications. Under a RESTFUL architecture, a requester in the IoT implements control of a target by operating resources of the general service entity. For example, the requester and the target may be different terminal devices that establish connection with the general service entity. For example, "resources" may represent a device, a function, an action, etc., or may also identify a device attribute, a function attribute, an action attribute, etc. Both the requester and the target may be represented as application entities. After the application entity transmits data or information to the general service entity, the data or information may be stored as a separate resource. The application entity may send a request to the general service entity, to update a resource stored on the general service entity and corresponding to the application entity, so as to reflect the state of the device run by the application entity. Such update may be real-time or periodic, or may be triggered by a certain condition. Therefore, other application entity communicating with the general service entity may learn the state of the device corresponding to the application entity by accessing the updated resource; or, other application entities communicating with the general service entity may operate the updated resource. For example, operating the updated resource includes acquiring information of the updated resource, deleting the information of the updated resource, notifying the information of the updated resource to a third party, or operating other resource based on the information including the updated resource, etc. It should be noted that, the entities as described in the present disclosure, for example, the application entity, the general service entity, and the data, etc., may all be represented by resources.

For example, other architecture may also be used to implement interaction between the application entity and the general service entity in the Internet of Things. For example, it may be implemented by using a remote procedure control (RPC) architecture; and the architecture will be implemented through different RPC methods, that is, through different types of functions to control the target, for example, the requester will not send a resource request, but send an action request.

For example, taking the smart home Internet of Things as an example, as shown in FIG. 1, a household appliance accesses the network, further accesses a smart home platform through the network, and is registered on the smart home platform. Through registration, each household appliance obtains a unique identification (ID). During operation, the household appliance reports data in real time or at regular intervals. For example, the household appliance may use a local area network or the Internet to access the smart home platform, for example, access in a wireless or wired mode. The smart home platform generates a corresponding virtual resource (i.e., a virtual household appliance) for the household appliance; each virtual household appliance also has its own unique identification; and the identification of the virtual household appliance is, for example, the same as the identification of the corresponding household appliance. Through the identification, mapping in one-to-one correspondence may be established between the virtual household appliance and the household appliance. Data transmission may be performed between a smart home application running in a mobile terminal device (e.g., a mobile phone, a tablet computer, etc.) and the smart home platform, so that the virtual household appliance may be accessed through the smart home platform, thereby implementing remote monitoring or remote control of household appliance. For example, the identification is unique; and data may be sent to the corresponding virtual household appliance through the identification, so as to operate the corresponding household appliance.

Figure 2:
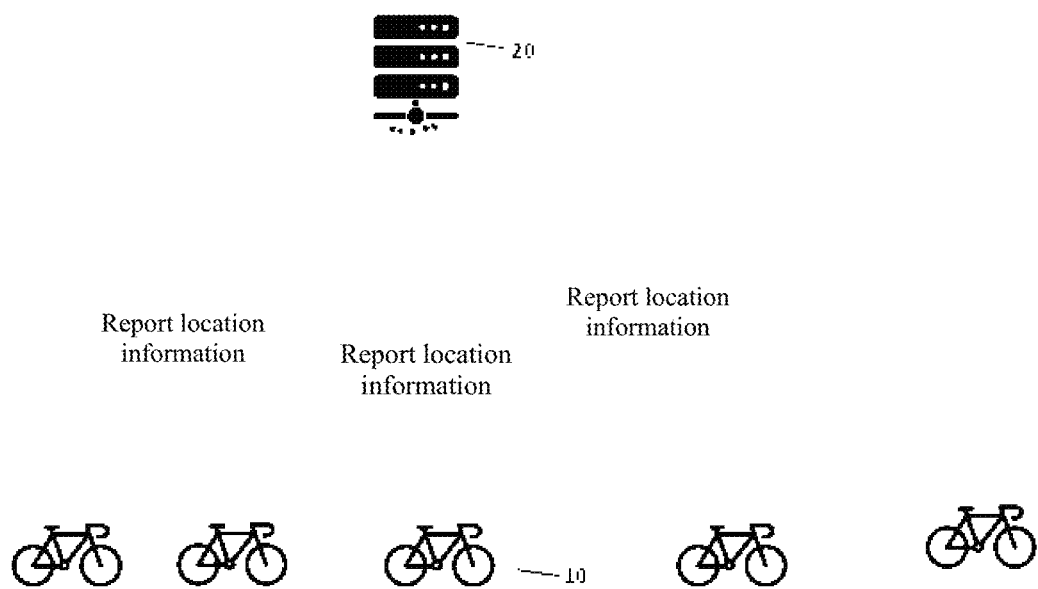
FIG. 2 is a schematic diagram of an application scenario of a shared bicycle.

For another example, the shared bicycle is a common IoT application scenario, and similar scenarios further include a shared electric vehicle, a shared motorcycle, and a shared car, etc. As shown in FIG. 2, the bicycle 10 has a smart lock; and the smart lock has functions such as communication, positioning, locking, and the like. A plurality of bicycles 10 are distributed in different locations, and communicate with the cloud server 20 through their respective smart locks, for example, report their respective location information, feed back usage (occupancy) statuses, and settle accounts, etc. For example, the bicycle 10 or the smart lock of the bicycle 10 is an example of the foregoing application entity; and the cloud server 20 is an example of the foregoing general service entity. Each bicycle 10 has a unique identification; and different bicycles 10 have different identifications.

Figure 3A:
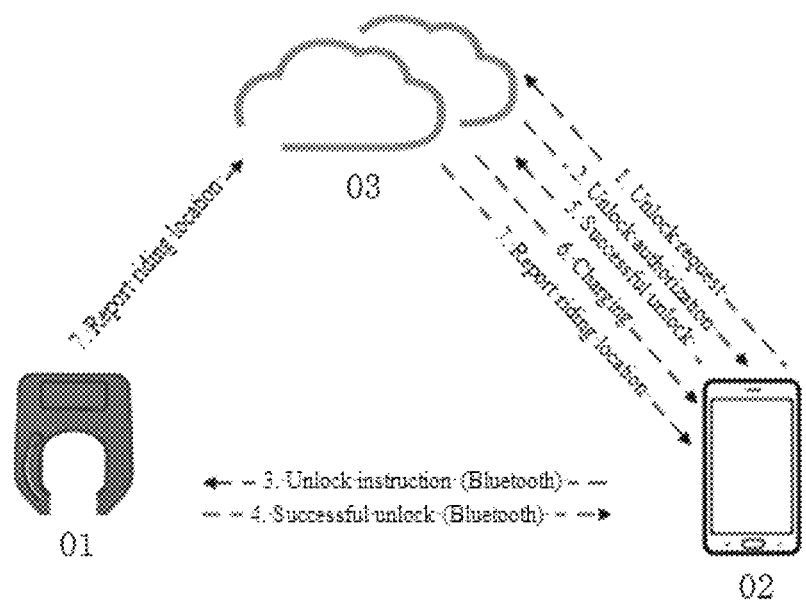
FIG. 3A is a schematic flow chart of an unlock mode of a shared bicycle.

FIG. 3A is a schematic flow chart of an unlock mode of a shared bicycle. As shown in FIG. 3A, the unlock mode is, for example, a local unlock mode, that is, a mobile phone 02 held by a user sends an unlock instruction to a smart lock 01 by means such as Bluetooth, near field communication (NFC), etc., so as to unlock the smart lock 01. The smart lock 01 is installed on the bicycle 10; and different smart locks 01 have different identifications, that is, different bicycles 10 have different identifications. For example, the identification is represented as a two-dimensional code and is printed or installed on the body of the bicycle 10. It should be noted that, in the description of the present disclosure, the identification of the smart lock 01 is equivalent to the identification of the bicycle 10 on which the smart lock 01 is installed.

As shown in FIG. 3A, when unlocking, the smart lock 01, the mobile phone 02 and the cloud 03 (i.e., the cloud server 20 shown in FIG. 2) interact with each other in an order of steps 1-2-3-4-5-6-7 shown in FIG. 3A. For example, the mobile phone 02 is a requester; and the smart lock 01 is a target.

Firstly, the mobile phone 02 scans the two-dimensional code on the bicycle 10, and then initiates an unlock request to the cloud 03. The unlock request carries identification information of the scanned bicycle 10 and the user's personal account information. The cloud 03 checks user information and bicycle information, and then sends authorization information to the mobile phone 02. For example, the authorization information includes an authorization password or an authorization token. The authorization password is a password of the smart lock 01. The authorization token is authorization of the mobile phone 02 to control the smart lock 01. For example, the mobile phone 02 may control the smart lock 01 to perform an unlocking action after acquiring authorization. Next, the mobile phone 02 transmits the unlock instruction and the authorization information to the smart lock 01 through, for example, a Bluetooth interface; and the smart lock 01 unlocks after verifying the authorization information, and notifies information of successful unlock to the mobile phone 02. Then, the mobile phone 02 sends the information of successful unlock to the cloud 03; and the cloud 03 starts to charge the user. During the user's riding process, the smart lock 01 and the mobile phone 02 may report their respective positioning information, for example, positioning information acquired through the global positioning system (GPS), to the cloud 03.

Figure 3B:
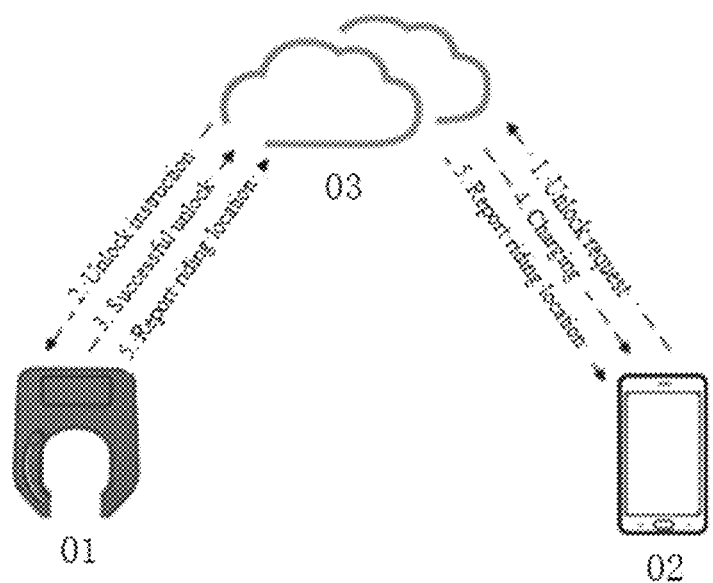
FIG. 3B is a schematic flow chart of another unlock mode of a shared bicycle.

FIG. 3B is a schematic flow chart of another unlock mode of a shared bicycle. As shown in FIG. 3B, the unlocking method is, for example, a cloud unlock mode (e.g., a traffic unlock mode or a short message unlock mode), that is, the cloud 03 sends an unlock instruction to the smart lock 01 through the network to unlock the same.

As shown in FIG. 3B, when unlocking, the smart lock 01, the mobile phone 02 and the cloud 03 interact with each other in an order of steps 1-2-3-4-5 shown in FIG. 3B.

Firstly, the mobile phone 02 scans the two-dimensional code on the bicycle 10, and then initiates an unlock request to the cloud 03. The unlock request carries identification information of the scanned bicycle 10 and the user's personal account information. The cloud 03 checks the user information and the bicycle information, and then sends the unlock instruction to the smart lock 01. The smart lock 01 unlocks after receiving the unlock instruction, and then sends information of successful unlock to the cloud 03. For example, in some examples, the smart lock 01 further sends a password or a secret key for next unlocking to the cloud 03 while sending the information of successful unlock. Next, the cloud 03 notifies the mobile phone 02 and starts charging. During the user's riding process, the smart lock 01 and the mobile phone 02 report their respective positioning information to the cloud 03.

It may be seen from the above two unlock modes that, when the user (i.e., the mobile phone 02) sends the unlock request, the user firstly needs to acquire the identification of the bicycle 10, that is, the identification of the virtual resource corresponding to the bicycle 10, and functions such as unlocking are implemented through the identification. However, there may be situations in which the identification of the bicycle 10 cannot be acquired or only partially acquired.

Figure 4A:
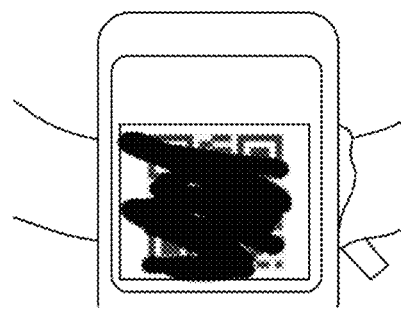
FIG. 4A is a schematic diagram of a damaged bicycle two-dimensional code.
Figure 4B:
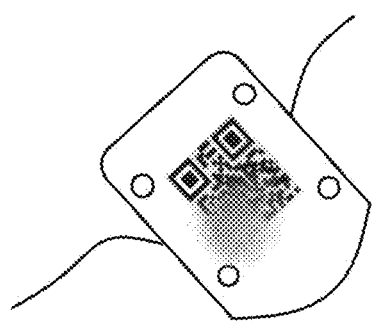
FIG. 4B is a schematic diagram of another damaged bicycle two-dimensional code.
Figure 4C:
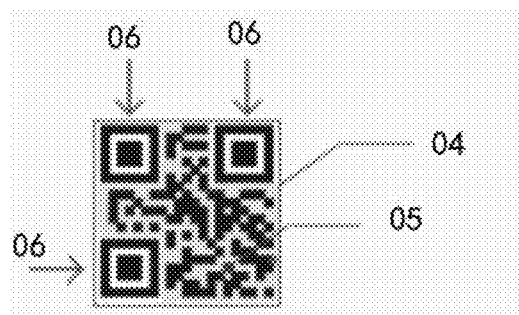
FIG. 4C is a schematic diagram of a two-dimensional code.

For example, as shown in FIG. 4A, some bicycles 10 have a two-dimensional code (or other identification, for example, a barcode or an identification number (string)) completely damaged, and the mobile phone 02 cannot scan and recognize the same, so the identification cannot be acquired. For example, as shown in FIG. 4B, some bicycles 10 have a two-dimensional code partially damaged; due to redundant design of the two-dimensional code, most information has dual backup, so the mobile phone 02 can recognize a portion of the identification after scanning the same. For example, as shown in FIG. 4C, within a data range 04 of the two-dimensional code, a plurality of code elements 05 are set according to certain rules; and the code elements 05 are rectangular regions constituting a smallest unit of the two-dimensional code. For example, there are positioning patterns 06 further provided at three right angles of the data range 04. In the case where the two-dimensional code is partially damaged, since there are still some code elements 05 that may be recognized, a portion of the identification may be obtained by scanning. For example, the identification of the bicycle 10 is a string of characters, and in the case where the two-dimensional code is partially damaged, the mobile phone 02 can recognize some characters in the string of characters after scanning.

In the case where the two-dimensional code is completely or partially damaged, the identification of the bicycle 10 cannot be acquired by recognizing the two-dimensional code. So the identification information of the bicycle 10 cannot be sent to the cloud 03 through the mobile phone 02, which further results in that the cloud 03 cannot be requested to perform subsequent operations on the bicycle 10, so that the bicycle 10 cannot be unlocked. This not only reduces user experience, but also makes the bicycle 10 with the damaged identification no longer available or easily retrieved, which increases operation and maintenance costs of device management.

At least one embodiment of the present disclosure provides a method for acquiring a target identification, a service entity, an application entity, an electronic apparatus, and a storage medium. By using this method, the identification of a target (i.e., a target identification) may be acquired in the case where the identification of the target is damaged or partially damaged, so as to continue monitoring or controlling the target. The method for acquiring a target identification provided by at least one embodiment may further reduce operation and maintenance costs of device management and help improve user experience.

Hereinafter, the embodiments of the present disclosure will be described in detail with reference to the accompanying drawings. It should be noted that, same reference signs in different drawings will be used to refer to same elements that have been described.

At least one embodiment of the present disclosure provides a method for acquiring a target identification. The method includes: receiving a first request, in which the first request is sent by a requester, and the first request includes location information of the requester; and determining a target identification according to the location information.

Figure 5:
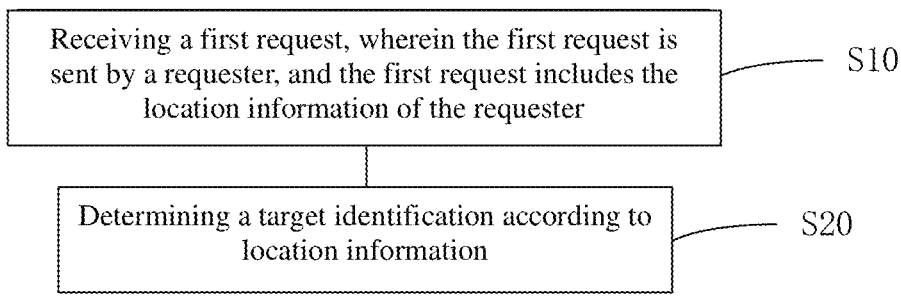
FIG. 5 is a schematic flow chart of a method for acquiring a target identification provided by some embodiments of the present disclosure.

FIG. 5 is a schematic flow chart of a method for acquiring a target identification provided by some embodiments of the present disclosure. As shown in FIG. 5, in at least one embodiment, the method includes operations below.

Step S10: receiving a first request; and step S20: determining a target identification according to location information.

For example, in step S10, the first request is sent by a requester; and the first request includes the location information of the requester. For example, the first request may be a request that does not execute a specific action, such as an acquisition request; or the first request may also be an action request (e.g., an unlock request). For example, the requester is a mobile terminal device, for example, a mobile phone, a tablet computer, or the like. The mobile terminal device includes a positioning unit, for example, a GPS module or a Beidou positioning module, so the location information of the mobile terminal device may be acquired. For example, the first request is sent to a general service entity. Both the requester and the target are registered at the general service entity. For example, the requester sends the first request in order to control or operate the target through the general service entity. The target is, for example, a terminal device or a node device in the Internet of Things. For example, the identification of the target is completely damaged and cannot be recognized, or is partially damaged and only partially recognizable. It should be noted that, the first request may not include the identification of the target, or may include a pre-judgment identification, and the pre-judgment identification may be, for example, a portion identification (portion of the identification) of the target.

For example, in step S20, the target identification is the identification of the above-described target; and the target identification is determined according to the location information of the requester, rather than being directly provided by the requester. After the target identification is determined, the general service entity may issue the target identification to the requester, and the requester sends an updated acquisition request according to the target identification (e.g., the updated acquisition request includes the target identification), so that the target may be controlled or operated through the general service entity. Of course, the embodiments of the present disclosure are not limited thereto. After the target identification is determined, the general service entity may also directly send an action request to the target according to the target identification, so as to directly control or operate the target. It should be noted that, in the embodiments of the present disclosure, after the target identification is determined according to the location information, interaction between the requester, the target and the general service entity may be interaction between the requester, the target and the general service entity in the general Internet of Things, which will not be limited by the embodiments of the present disclosure.

Figure 6:
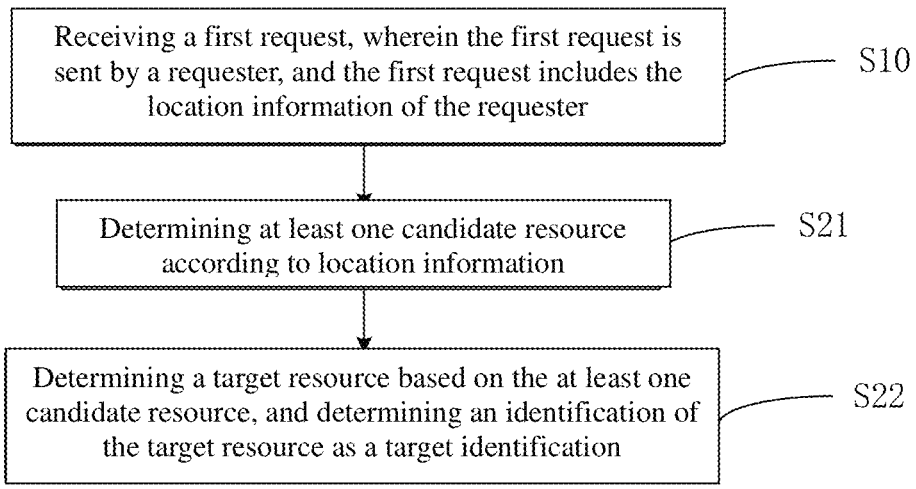
FIG. 6 is a schematic flow chart of another method for acquiring a target identification provided by some embodiments of the present disclosure.

FIG. 6 is a schematic flow chart of another method for acquiring a target identification provided by some embodiments of the present disclosure. For example, as shown in FIG. 6, in at least one embodiment, the method includes operations below.

Step S10: receiving a first request;

step S21: determining at least one candidate resource according to location information; and step S22: determining a target resource based on the at least one candidate resource, and determining an identification of the target resource as the target identification.

For example, in this embodiment, step S10 is basically the same as step S10 shown in FIG. 5, and no details will be repeated here. For example, step S20 shown in FIG. 5 may be embodied as step S21 and step S22 according to this embodiment.

For example, in step S21, candidate resources may be determined according to the location information; and the candidate resource is an undetermined resource that may be a target resource. For example, the candidate resources are part of a plurality of registered resources registered in the general service entity; and the number of the candidate resources may be one or more.

Figure 7:
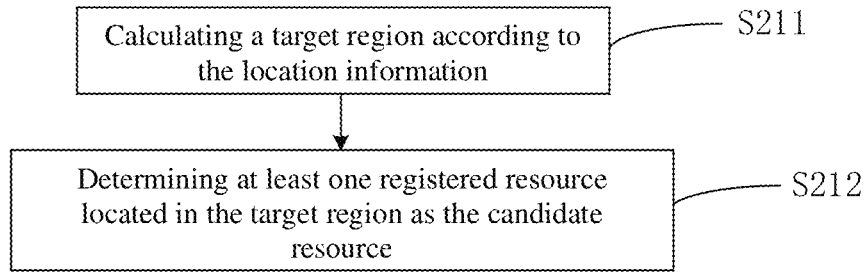
FIG. 7 is a specific exemplary schematic flow chart of step S21 shown in FIG. 6.

For example, an example of step S21 may be embodied as step S211 and step S212 shown in FIG. 7.

Step S211: calculating a target region according to the location information; and step S212: determining at least one registered resource located in the target region as the candidate resource.

For example, in step S211, the target region includes a plurality of target coordinate points; and distances between the plurality of target coordinate points and a coordinate point corresponding to the above-described location information are less than or equal to a first threshold. That is, the target region is a region within a certain distance range in the vicinity of a location of the requester. For example, the first threshold may be determined according to actual needs, for example, 2 meters, 3 meters or any other distance; correspondingly, the target region may be a region within 2 meters, 3 meters or other suitable distances in the vicinity of the location of the requester, which is not limited by the embodiments of the present disclosure.

For example, in step S212, after the target region is determined, the registered resources located in the target region are determined as candidate resources. Because the respective registered resources may report location information to the general service entity, the general service entity may determine the registered resources located in the target region according to locations of the respective registered resources. For example, in the application scenario shown in FIG. 2, the respective bicycles 10 (i.e., the registered resources) may report the location information to the cloud server 20 (i.e., the general service entity), so the cloud server 20 may learn the locations of the respective bicycles 10, and thus may determine one or more bicycles 10 located in the target region.

For example, the above-described first threshold for calculating the target region may be a preset value; and the preset value may be fixed, or may be adjusted within a certain range according to a certain rule. For example, in some examples, the preset value is fixed; after the target region is calculated, if there are no registered resources in the target region, it may report error, or may prompt the user to approach the bicycle 10 and resend the first request. This may be caused by a relatively far distance between the user's location and the bicycle 10 that the user wants to use. For example, in other examples, the preset value may be adjusted within a certain range according to a certain rule; after the target region is calculated, if there are no registered resources in the target region, the first threshold may be increased and the target region may be recalculated, and then it is judged whether there are registered resources in the new target region. In the above-described mode, it is convenient to continue subsequent steps to implement unlocking and improve user experience.

For example, as shown in FIG. 6, in step S22, after the candidate resources are determined, one of the determined candidate resources may be further determined as the target resource according to different situations, and the identification of the target resource is the target identification, thereby the target identification is obtained.

For example, in at least one embodiment, when the number of determined candidate resources is only one (i.e., single), the target identification may be determined in a mode below: directly determining the candidate resource as the target resource, and determining the identification of the target resource as the target identification.

Figure 8:
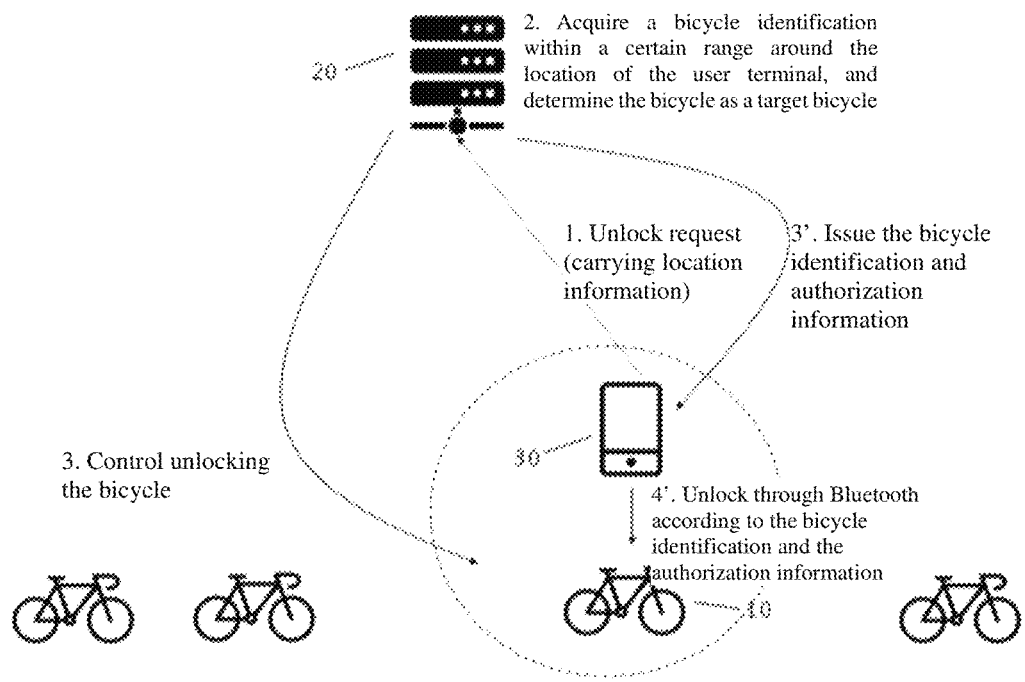
FIG. 8 is a schematic diagram of an application scenario of a method for acquiring a target identification provided by some embodiments of the present disclosure.

FIG. 8 shows an application scenario of the situation. As shown in FIG. 8, when unlocking the bicycle 10, the bicycle 10, the cloud server 20 and the user terminal 30 interact with each other in an order of steps 1-2-3 or 1-2-3'-4' shown in FIG. 8. For example, the user terminal 30 is the requester, which may be a mobile phone, a tablet computer, or the like. For example, the bicycle 10 is the target; and the bicycle 10 includes a smart lock and the identification is completely damaged and cannot be recognized.

Firstly, the user terminal 30 sends an unlock request to the cloud server 20 through a communication network. The unlock request carries location information of the user terminal 30, and may also carry the user's personal account information, etc. according to needs of the application. The cloud server 20 checks the user information (e.g., whether it is a registered user, whether account balance is empty, etc.), and then acquires, according to the location information of the user terminal 30, the identification of the bicycle 10 registered in the cloud server 20 and located within a certain range (e.g., within 2 meters) around the location of the user terminal 30. Therefore, the bicycles in a non-operating state may not be processed. When the user unlocks the bicycle 10, the user is usually located in the vicinity of the bicycle 10 to be unlocked. Therefore, the target bicycle (i.e., the bicycle 10 to be unlocked) is one of the bicycles 10 located within a certain range around the user terminal 30. In the situation shown in FIG. 8, there is only one bicycle 10 within a certain range around the location of the user terminal 30, so the cloud server 20 determines the unique bicycle 10 as the target bicycle.

For example, the cloud server 20 may firstly check whether the unique bicycle 10 is in an available state, for example, whether it is occupied by other user, or whether it is in a fault state; and when the bicycle 10 is in an available state, the cloud server 20 may perform subsequent operations, otherwise feeds back information that there are no available bicycles around to the user terminal 30. For example, in the cloud unlock mode, the cloud server 20 feeds back response information to the user terminal 30, and sends an unlock instruction to the target bicycle to control the target bicycle to be unlocked, and performs operations such as charging as needed. For example, in the local unlock mode, the cloud server 20 issues an identification and authorization information of the target bicycle to the user terminal 30; then the user terminal 30 controls unlocking the target bicycle through Bluetooth according to the identification and the authorization information; and then the user terminal 30 or the bicycle 10 feeds back the response information to the cloud server 20, and the cloud server 20 may perform operations such as charging. Therefore, although the identification of the bicycle 10 is completely damaged and cannot be recognized, the user terminal 30 may still control unlocking the bicycle 10. In embodiments below, operations adopted have similar flows, so some exemplary operations will not be repeated.

For example, in at least one embodiment, when the number of determined candidate resources is only one (i.e., single), and the first request further includes a pre-judgment identification that is a portion identification (portion of the identification) relative to a target identification, the target identification may be determined in a mode below: calculating a matching degree between the identification of the candidate resource and the pre-judgment identification; and in the case where the matching degree is greater than or equal to a second threshold, determining the candidate resource as a target resource, and determining the identification of the target resource as the target identification. For example, the pre-judgment identification is a portion identification (portion of the identification) relative to the target identification, that is, the pre-judgment identification may be a continuous portion of the target identification, or may be a combination of several independent portions of the target identification, which is not limited by the embodiments of the present disclosure.

Figure 9:
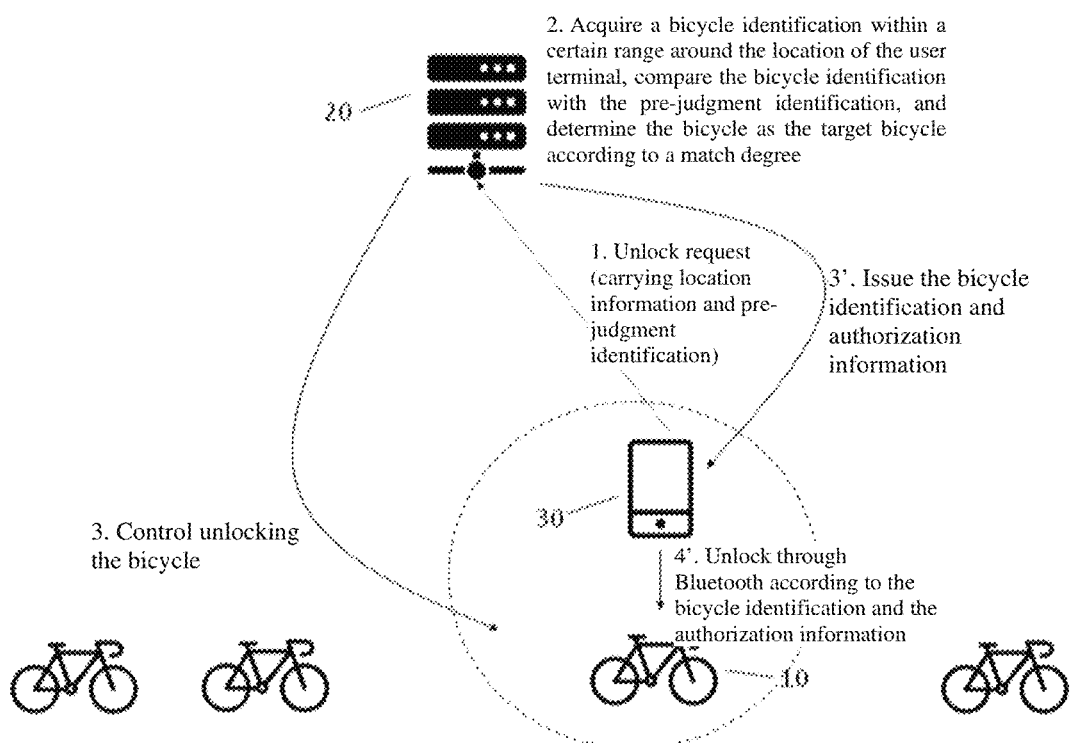
FIG. 9 is a schematic diagram of another application scenario of a method for acquiring a target identification provided by some embodiments of the present disclosure.

FIG. 9 shows an application scenario of the situation. As shown in FIG. 9, when unlocking the bicycle 10, the bicycle 10, the cloud server 20 and the user terminal 30 interact with each other in an order of steps 1-2-3 or 1-2-3'-4' shown in FIG. 9. For example, the identification of the bicycle 10 is partially damaged, so a portion of the identification may be acquired. For example, the acquired identification is referred to as a pre-judgment identification; the pre-judgment identification may be obtained by scanning the two-dimensional code of the bicycle 10 by the user terminal 30, or may be, for example, a portion of a serial number printed on the bicycle 10 that is manually input by the user, or may be acquired in other modes, which is not limited by the embodiments of the present disclosure.

Firstly, the user terminal 30 sends an unlock request to the cloud server 20. For example, the unlock request carries the location information of the user terminal 30, the user's personal account information, and the pre-judgment identification. The cloud server 20 checks the user information, and then acquires the identifications of the bicycles 10 within a certain range (e.g., within 2 meters) around the location of the user terminal 30 according to the location information of the user terminal 30. In the situation shown in FIG. 9, there is only one bicycle 10 within a certain range around the location of the user terminal 30. The cloud server 20 compares the identification of the bicycle 10 with the pre-judgment identification, that is, calculates a matching degree between the identification of the bicycle 10 and the pre-judgment identification. When the calculated matching degree is greater than or equal to the second threshold, the unique bicycle 10 is determined as the target bicycle. In the cloud unlock mode, the cloud server 20 sends an unlock instruction to the target bicycle to control unlocking the target bicycle. In the local unlock mode, the cloud server 20 issues the identification and the authorization information of the target bicycle to the user terminal 30, and then the user terminal 30 controls unlocking the target bicycle through Bluetooth according to the identification and the authorization information. Thus, although the identification of the bicycle 10 is partially damaged, the user terminal 30 may still control unlocking the bicycle 10.

It should be noted that, in the embodiments of the present disclosure, the above-described calculation method of the matching degree is not limited, and the number of overlapping portions between the identification of the bicycle 10 and the pre-judgment identification, the proportion of the overlapping portions between the identification of the bicycle 10 and the pre-judgment identification, etc. can be calculated, which may be determined according to actual needs. For example, a specific value of the second threshold may be determined according to an empirical value or an actual need, which is not limited by the embodiments of the present disclosure.

In the situation shown in FIG. 9, when the first request (e.g., the unlock request) includes the pre-judgment identification, by judging whether the matching degree is greater than or equal to the second threshold to determine the target bicycle, accuracy of unlocking may be improved, for example, when there is a great deviation in the location information, accidental false unlocking may be avoid in this way. For example, if the matching degree is less than the second threshold, it may prompt that unlocking fails. It should be noted that, the embodiments of the present disclosure are not limited thereto; when the first request includes the pre-judgment identification, the matching degree may not be calculated, but the unique bicycle 10 located in the target region may be directly determined as the target bicycle, that is, the operation mode shown in FIG. 8 is still adopted, so that unlocking efficiency may be improved.

Figure 10:
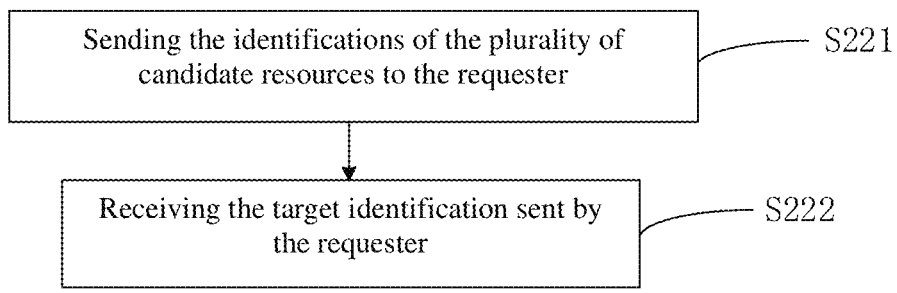
FIG. 10 is a specific exemplary schematic flow chart of step S22 shown in FIG. 6.
Figure 11:
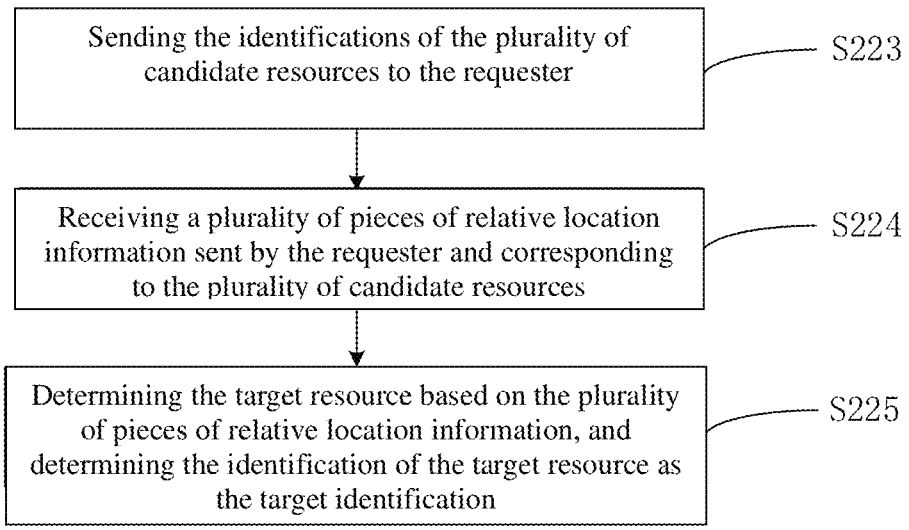
FIG. 11 is another specific exemplary schematic flow chart of step S22 shown in FIG. 6.

For example, in at least one embodiment, when the number of determined candidate resources is plural, the target identification may be determined in the mode shown in FIG. 10 or FIG. 11.

FIG. 10 is a specific exemplary schematic flow chart of step S22 shown in FIG. 6. As shown in FIG. 10, in at least one embodiment, step S22 may include operations below.

Step S221: sending identifications of the plurality of candidate resources to the requester; and step S222: receiving the target identification sent by the requester.

For example, in step S221, the identifications of the plurality of candidate resources are sent to the requester, so that the requester calculates and determines the target resource according to the identifications of the plurality of candidate resources. For example, after receiving the identifications of the plurality of candidate resources, the requester respectively calculates relative location information of the requester itself and the plurality of candidate resources, and determines the target resource according to the calculated relative location information, thereby obtaining the target identification. For example, one of the plurality of candidate resources is determined as the target resource in the above-described mode; and the identification of the target resource is the target identification. For example, when sending the identifications of the plurality of candidate resources to the requester, authority for communicating with the plurality of candidate resources may also be sent to the requester, so as to facilitate data transmission between the requester and the plurality of candidate resources to calculate the relative location information.

For example, the relative location information includes at least one of a relative distance of the requester and the candidate resource, an angle of arrival (AOA), or an angle of departure (AOD). For example, a positioning algorithm based on the angle of arrival of the signal may be used to calculate the relative distance, the angle of arrival and the angle of departure as described above, or other applicable network node self-positioning algorithm may also be used to calculate the relative location information, which is not limited by the embodiments of the present disclosure. For the calculation methods of the relative distance, the angle of arrival and the angle of departure, conventional design may be referred to, and no details will be repeated here.

For example, the target resource may be determined according to any one or two of the relative distance, the angle of arrival, and the angle of departure, or the three may also be combined to determine the target resource. For example, in some examples, a candidate resource with an angle of arrival or an angle of departure of approximately 90 degrees may be determined as the target resource, or a candidate resource with a smallest relative distance may be determined as the target resource. For example, in other examples, weighting factors may be assigned to the relative distance, the angle of arrival, and the angle of departure; and the relative distance, the angle of arrival and the angle of departure may be comprehensively considered, thereby determining the target resource. For example, in some other examples, firstly, screening is performed through the angle of arrival and the angle of departure; when the angles of arrival or the angles of departure between the requester and the plurality of candidate resources are relatively close to each other so that accurate judgment cannot be made through the angle of arrival and the angle of departure, the relative distances between the requester and the plurality of candidate resources are further judged; and the target resource is determined by comprehensively considering the two. Of course, the embodiments of the present disclosure are not limited thereto, and any applicable mode may be used to determine the target resource according to the relative distance, the angle of arrival, and the angle of departure, which may be determined according to actual needs.

For example, in step S222, the general service entity receives the target identification sent by the requester, so as to obtain the target identification corresponding to the target resource. For example, in this embodiment, after sending the identification of the candidate resource, the general service entity does not need to perform operations such as calculation or judgment, and only needs to wait for the requester to return the target identification.

FIG. 11 is another specific exemplary schematic flow chart of step S22 shown in FIG. 6. As shown in FIG. 11, in at least one embodiment, step S22 may include operations below.

Step S223: sending the identifications of the plurality of candidate resources to the requester;

step S224: receiving a plurality of pieces of relative location information sent by the requester and corresponding to the plurality of candidate resources; and step S225: determining the target resource based on the plurality of pieces of relative location information, and determining the identification of the target resource as the target identification.

For example, in step S223, the identifications of the plurality of candidate resources are sent to the requester, so that the requester calculates the relative location information according to the identifications of the plurality of candidate resources. For example, after receiving the identifications of the plurality of candidate resources, the requester respectively calculates the relative location information of the requester itself and the plurality of candidate resources. For example, the relative location information includes at least one of a relative distance of the requester and the candidate resource, an angle of arrival, or an angle of departure. For example, when the identifications of the plurality of candidate resources are sent to the requester, authority for communicating with the plurality of candidate resources may also be sent to the requester, so as to facilitate data transmission between the requester and the plurality of candidate resources to calculate the relative location information.

For example, in step S224, after the requester obtains the relative location information by calculation, the general service entity receives the plurality of pieces of relative location information sent by the requester and corresponding to the plurality of candidate resources. For example, in this embodiment, the requester calculates the relative location information, but does not make a subsequent judgment based on the calculated relative location information; and the subsequent judgment is made by the general service entity.

For example, in step S225, the target resource may be determined according to any one or two of the relative distance, the angle of arrival, and the angle of departure, or the three may be combined to determine the target resource. For example, in some examples, a candidate resource with a smallest relative distance may be determined as the target resource, or, a candidate resource with an angle of arrival or an angle of departure of approximately 90 degrees may be determined as the target resource. For example, in other examples, weighting factors may be assigned to the relative distance, the angle of arrival, and the angle of departure; and the relative distance, the angle of arrival and the angle of departure may be comprehensively considered, thereby determining the target resource. For example, in some other examples, firstly, screening is performed through the angle of arrival and the angle of departure; when the angles of arrival or the angles of departure between the requester and the plurality of candidate resources are relatively close to each other so that accurate judgment cannot be made through the angle of arrival and the angle of departure, the relative distances between the requester and the plurality of candidate resources are further judged, and the target resource is determined by comprehensively considering the two. Of course, the embodiments of the present disclosure are not limited thereto, and any applicable mode may be used to determine the target resource according to the relative distance, the angle of arrival, and the angle of departure, which may be determined according to actual needs.

For example, in this embodiment, after sending the identifications of the candidate resources, the general service entity waits for the requester to return the plurality of pieces of relative location information, and then determines the target resource according to the plurality of pieces of relative location information received, thereby acquiring the target identification.

Figure 12:
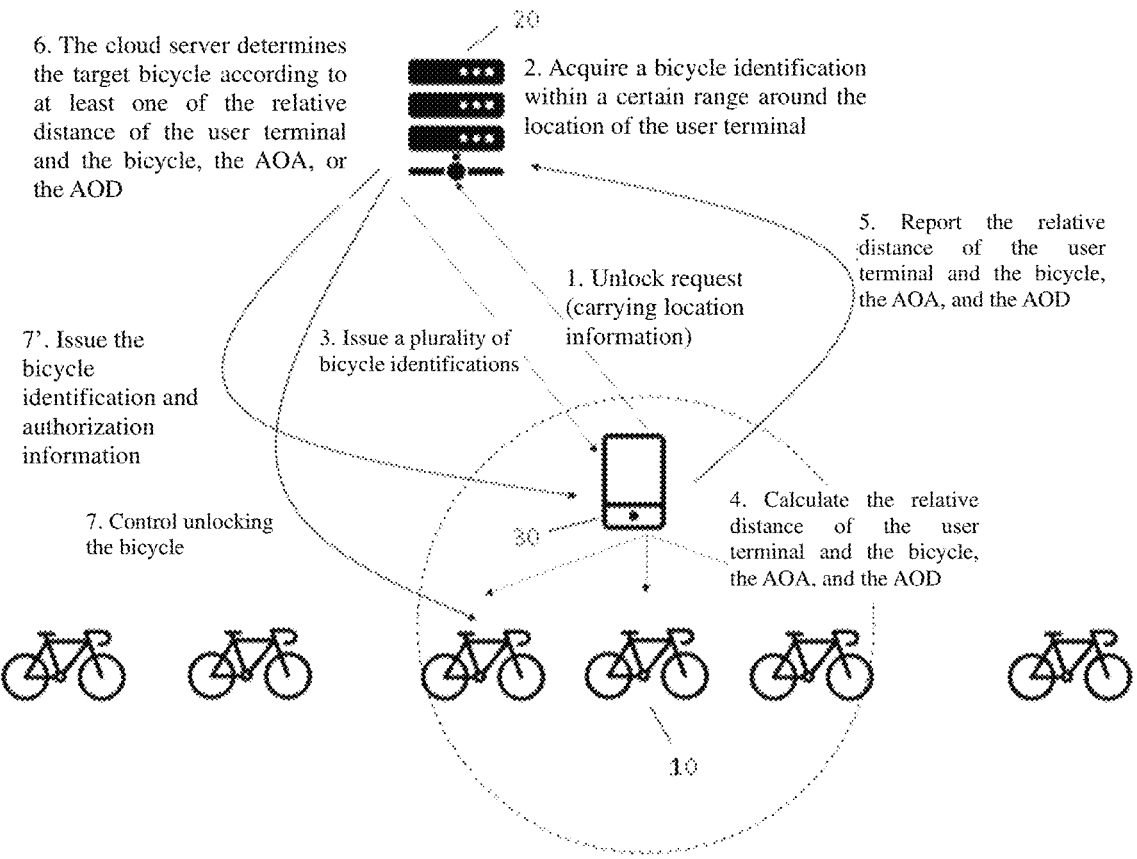
FIG. 12 is a schematic diagram of an application scenario of a method for acquiring a target identification provided by some embodiments of the present disclosure.

FIG. 12 shows an application scenario of the situation. As shown in FIG. 12, when the bicycle 10 is unlocked, the bicycle 10, the cloud server 20 and the user terminal 30 interact with each other in an order of steps 1-2-3-4-5-6-7 or 1-2-3-4-5-6-7' shown in FIG. 12. For example, the identification of the bicycle 10 is completely damaged and cannot be recognized.

Firstly, the user terminal 30 sends an unlock request to the cloud server 20. The unlock request carries the location information of the user terminal 30 and the user's personal account information. The cloud server 20 checks the user information, and then acquires the identifications of the bicycles 10 within a certain range (e.g., within 2 meters) around the location of the user terminal 30 according to the location information of the user terminal 30. In the situation shown in FIG. 12, there are a plurality of bicycles 10 within a certain range around the location of the user terminal 30. The cloud server 20 sends the identifications of the plurality of bicycles 10 to the user terminal 30. For example, the user terminal 30 may use the obtained identifications of the plurality of bicycles 10 to establish signal connection with the plurality of bicycles 10 (e.g., through a Bluetooth connection), for example, the user terminal 30 broadcasts the obtained identifications of the plurality of bicycles 10 one by one, and the corresponding bicycles 10 feeds back or responds after receiving broadcast packets containing the identifications thereof, thereby establishing the signal connection, and the user terminal 30 may learn distances and directions of these bicycles 10 to the user terminal 30 through the signal connection, thereby calculating the relative location information to the plurality of bicycles 10, that is, calculating the relative distance to the plurality of bicycles 10, the angle of arrival and the angle of departure. Then, the user terminal 30 uploads the calculated relative location information corresponding to the plurality of bicycles 10 to the cloud server 20.

The cloud server 20 determines one of the plurality of bicycles 10 as the target bicycle according to the received relative location information. For example, the target bicycle may be a bicycle with a closest relative distance to the user terminal 30 (the user terminal 30 is usually located next to a bicycle that needs to be unlocked), or may also be a bicycle with an angle of arrival or an angle of departure of approximately 90 degrees from the user terminal 30 (the user terminal 30 usually directly faces the bicycle that needs to be unlocked), or may also be a bicycle determined in other calculation mode according to the relative location information. In the cloud unlock mode, the cloud server 20 sends an unlock instruction to the target bicycle to control unlocking the target bicycle. In the local unlock mode, the cloud server 20 issues the identification and the authorization information of the target bicycle to the user terminal 30; and then the user terminal 30 controls unlocking the target bicycle through Bluetooth according to the identification and the authorization information. Therefore, although the identification of the bicycle 10 is completely damaged and cannot be recognized, the user terminal 30 may still control unlocking the bicycle 10.

It should be noted that, in the application scenario shown in FIG. 12, the method shown in FIG. 10 may also be used, and it is only necessary to adjust step 4, step 5 and step 6. For example, as shown in FIG. 12, when the method shown in FIG. 10 is adopted, in step 4, after the user terminal 30 calculates and obtains the pieces of relative location information corresponding to the plurality of bicycles 10, the target bicycle is determined according to these pieces of relative location information, so that the target identification may be determined. In step 5, the user terminal 30 uploads the target identification. Accordingly, step 6 may be omitted. The cloud server 20 directly performs step 7 or step 7' according to the received target identification.

Figure 13:
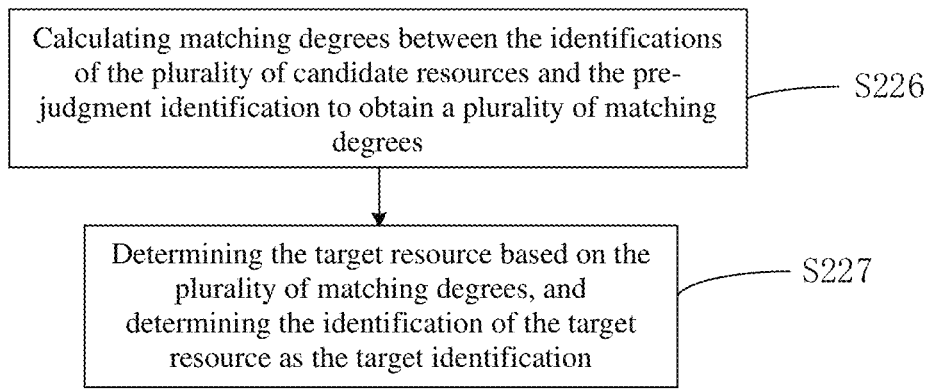
FIG. 13 is another specific exemplary schematic flow chart of step S22 shown in FIG. 6.

For example, in at least one embodiment, when the number of determined candidate resources is plural, and the first request further includes a pre-judgment identification that is a portion identification relative to the target identification, the target identification may be determined in the mode shown in FIG. 13.

FIG. 13 is another specific exemplary schematic flow chart of step S22 shown in FIG. 6. For example, as shown in FIG. 13, in at least one embodiment, step S22 may include operations below.

Step S226: calculating matching degrees between the identifications of the plurality of candidate resources and the pre-judgment identification to obtain a plurality of matching degrees; and step S227: determining the target resource based on the plurality of matching degrees, and determining the identification of the target resource as the target identification.

For example, in step S226, the matching degree may be calculated in the mode as described above, and no details will be repeated here.

Figure 14:
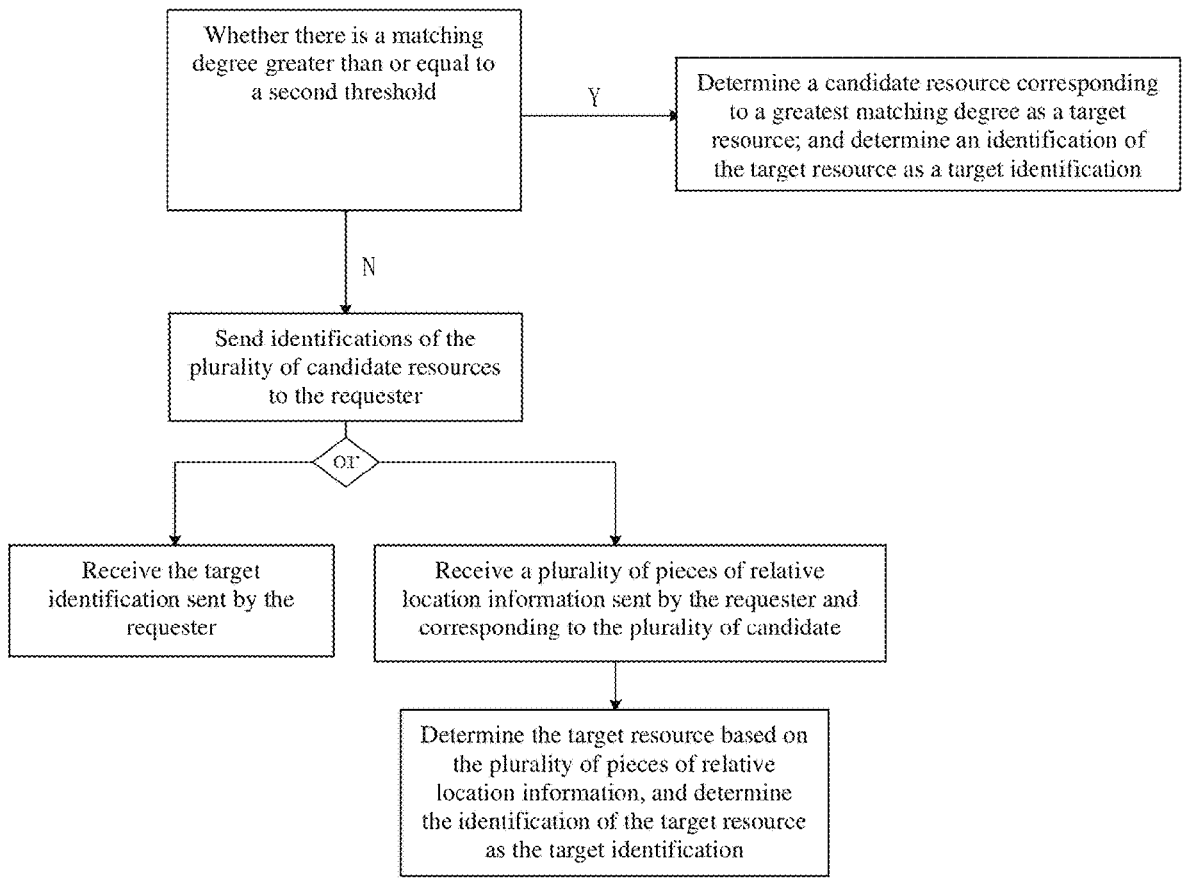
FIG. 14 is a specific exemplary schematic flow chart of step S227 shown in FIG. 13.

For example, an example of step S227 may be embodied as a plurality of steps shown in FIG. 14. For example, as shown in FIG. 14, it is firstly judged whether there is at least one matching degree greater than or equal to the second threshold. For example, a specific value of the second threshold may be determined according to an empirical value or an actual need, which is not limited by the embodiments of the present disclosure. If there is at least one matching degree greater than or equal to the second threshold (i.e., there is a matching degree that meets requirements), a candidate resource corresponding to a greatest matching degree among the at least one matching degree greater than or equal to the second threshold is determined as the target resource, and the identification of the target resource is determined as the target identification.

If the plurality of matching degrees are all less than the second threshold (i.e., there is no matching degree that meets the requirements), the identifications of the plurality of candidate resources are sent to the requester.

Next, in the first mode, the requester calculates the relative location information of the requester and the candidate resource, determines the target resource according to the relative location information, obtains the target identification, and sends the target identification to the general service entity. Or, in the second mode, the requester calculates the relative location information of the requester and the candidate resource, and sends the relative location information to the general service entity. For example, the relative location information includes at least one of a relative distance of the requester and the candidate resource, an angle of arrival, and an angle of departure. For relevant description about the relative location information and determining the target resource according to the relative location information, the above content may be referred to, and no details will be repeated here.

In the steps shown in FIG. 14, in the first mode, the target identification sent by the requester is received; or, in the second mode, the plurality of pieces of relative location information sent by the requester and corresponding to the plurality of candidate resources are received, then the target resource is determined based on the plurality of pieces of relative location information, and the identification of the target resource is determined as the target identification.

Figure 15:
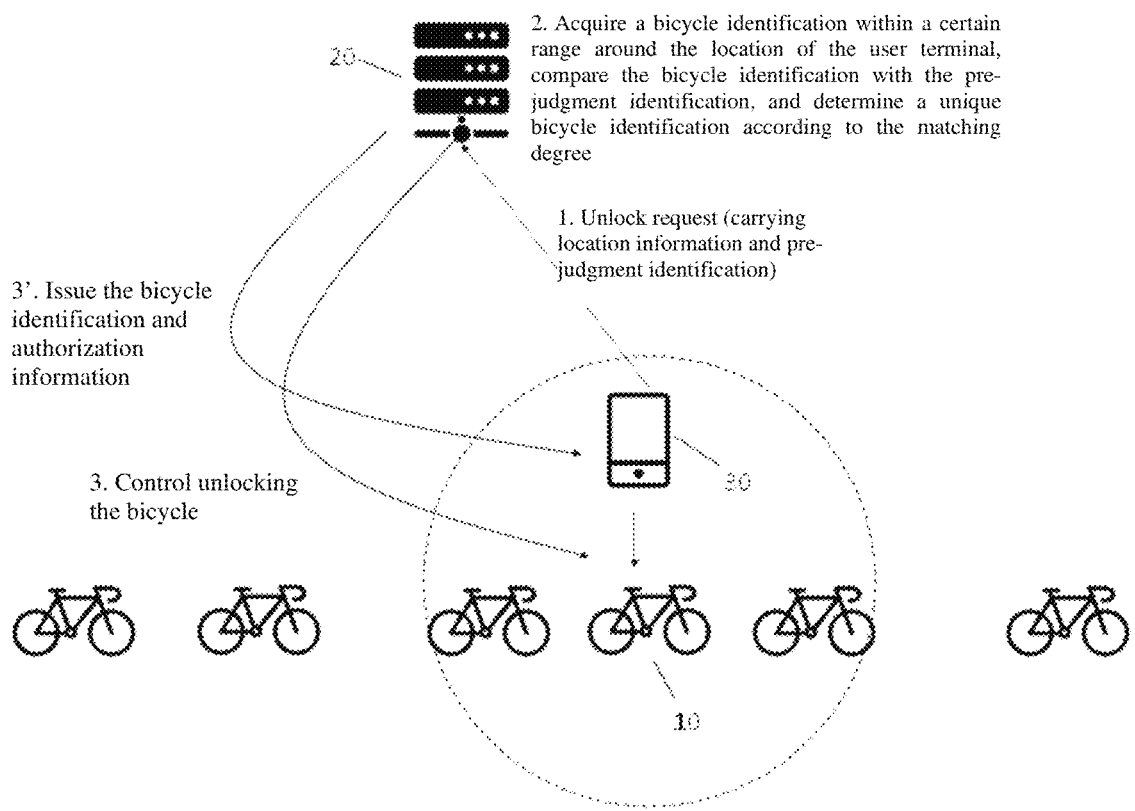
FIG. 15 is a schematic diagram of an application scenario of a method for acquiring a target identification provided by some embodiments of the present disclosure.

FIG. 15 shows an application scenario of the above-described situation where there is a matching degree that meets the requirements. As shown in FIG. 15, when unlocking the bicycle 10, the bicycle 10, the cloud server 20 and the user terminal 30 interact with each other in an order of steps 1-2-3 or 1-2-3' shown in FIG. 12. For example, the identification of the bicycle 10 is partially damaged, so the user terminal 30 may obtain the pre-judgment identification by scanning the two-dimensional code of the bicycle 10.

Firstly, the user terminal 30 sends an unlock request to the cloud server 20. The unlock request carries the location information of the user terminal 30, the user's personal account information and the pre-judgment identification. The cloud server 20 checks the user information, and then acquires the identifications of the bicycles 10 within a certain range (e.g., within 2 meters) around the location of the user terminal 30 according to the location information of the user terminal 30. In the situation shown in FIG. 15, there are a plurality of bicycles 10 within a certain range around the location of the user terminal 30. The cloud server 20 compares the identifications of the plurality of bicycles 10 with the pre-judgment identification, that is, the cloud server 20 calculates matching degrees between the identifications of the plurality of bicycles 10 and the pre-judgment identification, and obtains a plurality of matching degrees.

When there is a matching degree greater than or equal to the second threshold among the plurality of matching degrees, a bicycle 10 corresponding to a greatest matching degree is determined as the target bicycle, and an identification of the target bicycle is determined as the target identification. In the cloud unlock mode, the cloud server 20 sends an unlock instruction to the target bicycle to control unlocking the target bicycle. In the local unlock mode, the cloud server 20 issues the identification and the authorization information of the target bicycle to the user terminal 30; and then the user terminal 30 controls unlocking the target bicycle through Bluetooth according to the identification and the authorization information. Thus, although the identification of the bicycle 10 is partially damaged, the user terminal 30 may still control unlocking the bicycle 10.

Figure 16:
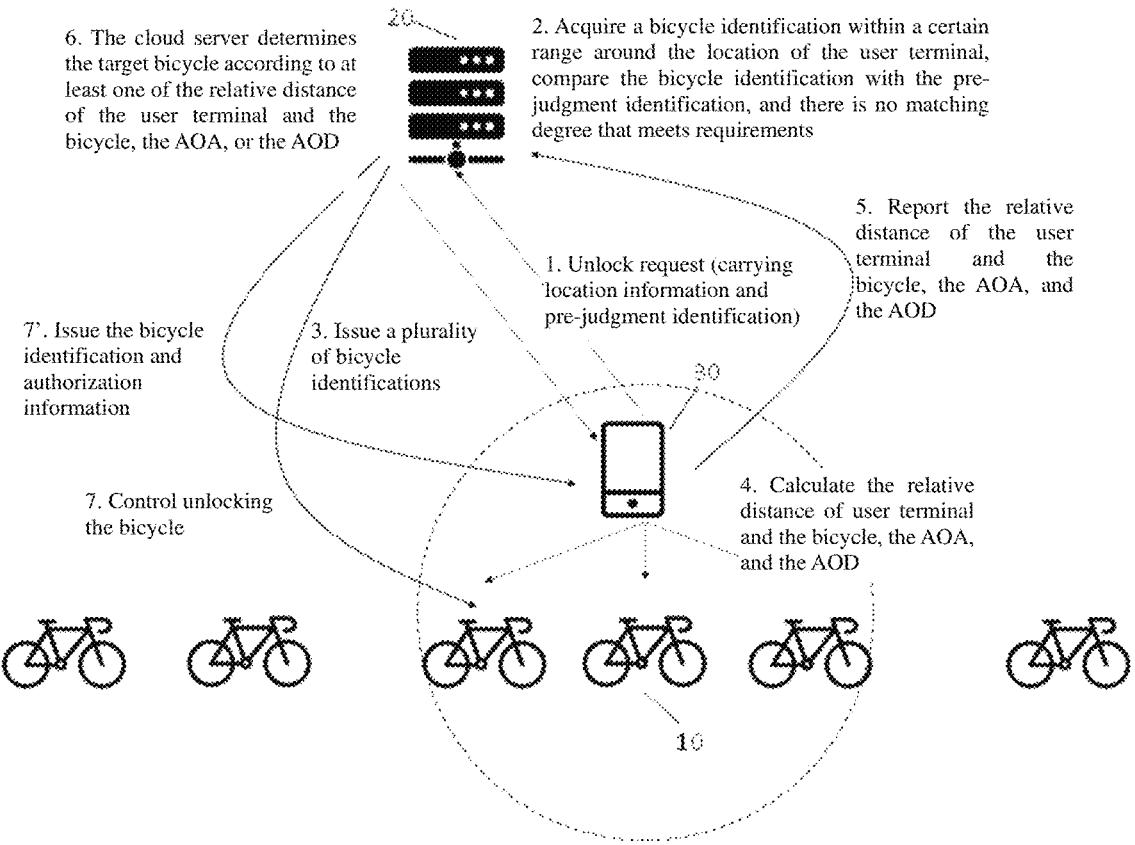
FIG. 16 is a schematic diagram of another application scenario of a method for acquiring a target identification provided by some embodiments of the present disclosure.

FIG. 16 shows an application scenario of the above-described situation where there is no matching degree that meets the requirements. As shown in FIG. 16, when unlocking the bicycle 10, the bicycle 10, the cloud server 20 and the user terminal 30 interact with each other in an order of steps 1-2-3-4-5-6-7 or 1-2-3-4-5-6-7' shown in FIG. 16. For example, the identification of the bicycle 10 is partially damaged, so the user terminal 30 may obtain the pre-judgment identification by scanning the two-dimensional code of the bicycle 10.

Firstly, the user terminal 30 sends an unlock request to the cloud server 20. The unlock request carries the location information of the user terminal 30, the user's personal account information and the pre-judgment identification. The cloud server 20 checks the user information, and then acquires the identifications of the bicycles 10 within a certain range (e.g., within 2 meters) around the location of the user terminal 30 according to the location information of the user terminal 30. In the situation shown in FIG. 16, there are a plurality of bicycles 10 within a certain range around the location of the user terminal 30. The cloud server 20 compares the identifications of the plurality of bicycles 10 with the pre-judgment identification, that is, it calculates matching degrees between the identifications of the plurality of bicycles 10 and the pre-judgment identification, and obtains a plurality of matching degrees. When the plurality of matching degrees are all less than the second threshold, that is, there is no matching degree that meets the requirements, the cloud server 20 sends the identifications of the plurality of bicycles 10 to the user terminal 30. The user terminal 30 establishes a signal connection with the plurality of bicycles 10 (e.g., through a Bluetooth connection), and calculates the relative location information to the plurality of bicycles 10, that is, calculates the relative distance to the plurality of bicycles 10, the angle of arrival and the angle of departure. Then, the user terminal 30 uploads the calculated relative location information corresponding to the plurality of bicycles 10 to the cloud server 20.

The cloud server 20 determines one of the plurality of bicycles 10 as the target bicycle according to the received relative location information. For example, the target bicycle may be a bicycle with a closest relative distance to the user terminal 30 (the user terminal 30 is usually located next to the bicycle that needs to be unlocked), or may also be a bicycle with an angle of arrival or an angle of departure of approximately 90 degrees from the user terminal 30 (the user terminal 30 usually directly faces the bicycle that needs to be unlocked), or may also be a bicycle determined in other calculation mode according to the relative location information. For example, steps 4 to 6 shown in FIG. 16 correspond to the second mode as described above, that is, the cloud server 20, instead of the user terminal 30, judges the target bicycle. Then, in the cloud unlock mode, the cloud server 20 sends an unlock instruction to the target bicycle to control unlocking the target bicycle. In the local unlock mode, the cloud server 20 issues the identification and the authorization information of the target bicycle to the user terminal 30, and then the user terminal 30 controls unlocking the target bicycle through Bluetooth according to the identification and the authorization information. Thus, although the identification of the bicycle 10 is partially damaged, the user terminal 30 may still control unlocking the bicycle 10.

For example, in the application scenario shown in FIG. 16, steps 4 to 6 may also be adjusted, so as to correspond to the first mode as described above, that is, the user terminal 30, instead of the cloud server 20, judges the target bicycle. For example, adjustments below may be made. In step 4, after the user terminal 30 calculates and obtains the pieces of relative location information corresponding to the plurality of bicycles 10, the user terminal 30 determines the target bicycle according to these pieces of relative location information, so that the target identification may be determined. In step 5, the user terminal 30 uploads the target identification. Accordingly, step 6 may be omitted. The cloud server 20 directly performs step 7 or step 7' according to the received target identification.

In the embodiments of the present disclosure, in the case where the identification of the target is damaged or partially damaged, the target that the requester wants to operate is judged by constructing a location structure between the requester and the target according to the location information of the requester, so as to obtain the identification of the target (i.e., the target identification), and further implement monitoring or control of the target, which can reduce operation and maintenance costs of device management and help improve user experience.

For example, in the application scenarios shown in FIG. 8, FIG. 9, FIG. 12, FIG. 15, and FIG. 16, no matter whether there is other bicycle within a certain range in the vicinity of the target bicycle, or whether the identification of the target bicycle is completely or partially damaged, the target bicycle can be unlocked based on the location information of the requester, so that the target bicycle can still be used without recalling and resetting the two-dimensional code, which reduces operation and maintenance costs of device management and helps to improve user experience.

At least one embodiment of the present disclosure further provides a service entity. The service entity can acquire an identification of a target (i.e., a target identification) in the case where the identification of the target is damaged or partially damaged, so as to continue monitoring or controlling the target. The service entity provided by at least one embodiment may further reduce operation and maintenance costs of device management and help improve user experience.

Figure 17:
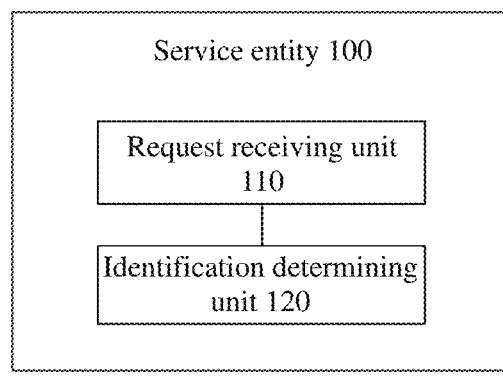
FIG. 17 is a schematic block diagram of a service entity provided by some embodiments of the present disclosure.

FIG. 17 is a schematic block diagram of a service entity provided by some embodiments of the present disclosure. As shown in FIG. 17, the service entity 100 includes a request receiving unit 110 and an identification determining unit 120.

For example, the request receiving unit 110 is configured to receive a first request. For example, the first request is sent by the requester, and the first request includes location information of the requester. For example, the request receiving unit 110 may execute step S10 of the method for acquiring the target identification shown in FIG. 5. For example, the identification determining unit 120 is configured to determine the target identification according to the location information. For example, the identification determining unit 120 may execute step S20 of the method for acquiring the target identification shown in FIG. 5. For detailed description of the request receiving unit 110 and the identification determining unit 120, the above description of step S10 and step S20 of the method for acquiring the target identification may be referred to, and no details will be repeated here.

It should be noted that, in the embodiments of the present disclosure, the request receiving unit 110 and the identification determining unit 120 may be hardware, software, firmware, and any feasible combination thereof. For example, the request receiving unit 110 and the identification determining unit 120 may be special or general purpose circuits, chips or apparatuses, etc., or may also be a combination of a processor and a memory, for example, the processor may be a central processing unit (CPU), a digital signal processor (DSP), etc., the memory may be any type of memory (e.g., flash memory, etc.), which stores computer-executable codes for implementing functions such as receiving a request, determining a target identification, etc., data for executing the computer-executable codes, and resulting data. Specific implementation forms of the request receiving unit 110 and the identification determining unit 120 are not limited by the embodiments of the present disclosure.

It should be noted that, in the embodiments of the present disclosure, the service entity 100 may be the foregoing general service entity, and may be implemented as a software module or an application program of a service platform (e.g., a server); and the service platform may be local or remote (e.g., in cloud). Specific implementation forms of the service entity 100 are not limited by the embodiments of the present disclosure. For detailed description and technical effects of the service entity 100, the above description of the method for acquiring the target identification may be referred to, and no details will be repeated here.

At least one embodiment of the present disclosure further provides a method for acquiring a target identification. By using the method, an identification of a target (i.e., a target identification) may be acquired in the case where the identification of the target is damaged or partially damaged, so as to continue monitoring or controlling the target. A method for acquiring a target identification provided by at least one embodiment may further reduce operation and maintenance costs of device management and help improve user experience.

Figure 18:
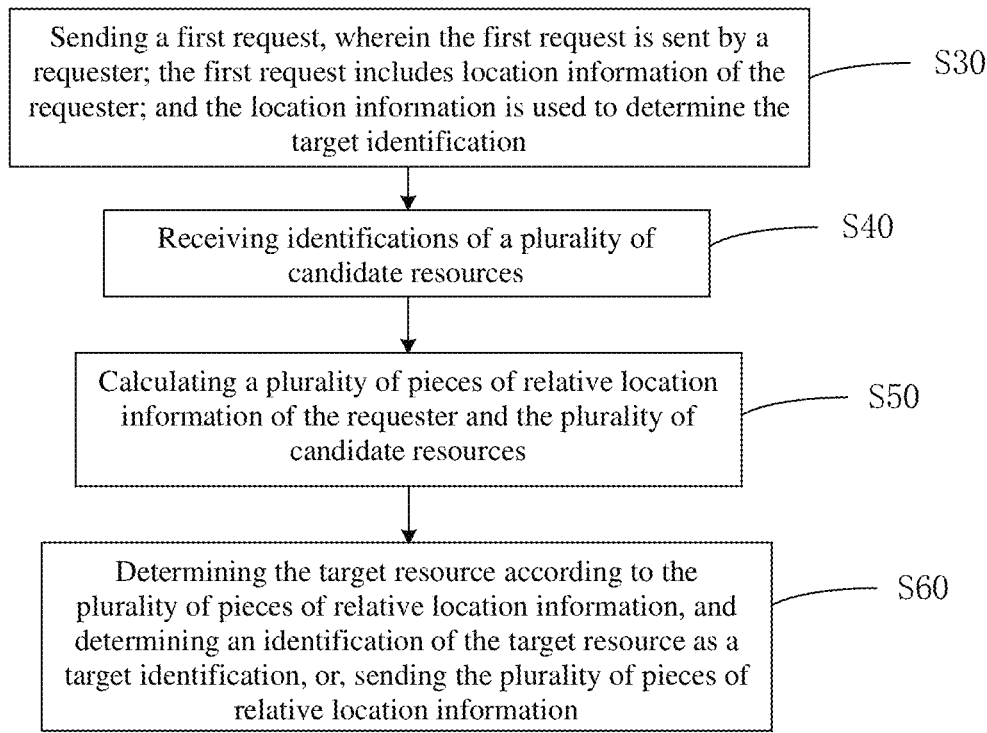
FIG. 18 is a schematic flow chart of a method for acquiring a target identification provided by some embodiments of the present disclosure.

FIG. 18 is a schematic flow chart of a method for acquiring a target identification provided by some embodiments of the present disclosure. For example, in at least one embodiment, as shown in FIG. 18, the method includes operations below.

Step S30: sending a first request.

For example, the first request is sent by a requester; the first request includes location information of the requester; and the location information is used to determine the target identification. For example, the method is executed by a requester. The requester is, for example, a mobile terminal device, for example, a mobile phone, a tablet computer, or the like. The mobile terminal device includes a positioning unit, for example, a GPS module or a Beidou positioning module, so the location information of the mobile terminal device may be acquired. For example, the first request may be a request that does not execute a specific action, such as an acquisition request; or the first request may also be an action request (e.g., an unlock request). For example, the first request may be sent to the general service entity, so that the target may be controlled or operated through the general service entity. The target is, for example, a terminal device or a node device in the Internet of Things. For example, the identification of the target (i.e., the target identification) is completely damaged and cannot be recognized, or is partially damaged and only a portion thereof may be recognized. For example, the first request may further include a pre-judgment identification that is a portion identification relative to the target identification; and the pre-judgment identification may be, for example, a portion of the target identification.

For example, in at least one embodiment, as shown in FIG. 18, the method further includes operations below.

Step S40: receiving identifications of a plurality of candidate resources;

step S50: calculating a plurality of pieces of relative location information of the requester and the plurality of candidate resources; and step S60: determining the target resource according to the plurality of pieces of relative location information, and determining an identification of the target resource as the target identification, or, sending the plurality of pieces of relative location information.

For example, in step S40, when it is difficult for the general service entity to determine a unique target only based on the location information, for example, when there are a plurality of candidate resources within a certain range in the vicinity of the requester, or when there are a plurality of candidate resources within a certain range in the vicinity of the requester and the matching degrees between the identifications of the plurality of candidate resources and the pre-judgment identification do not meet requirements, the general service entity may send the identifications of the plurality of candidate resources to the requester, and the requester receives the identifications of the plurality of candidate resources for subsequent processing.

For example, in step S50, the relative location information includes at least one of a relative distance of the requester and the candidate resource, an angle of arrival, or an angle of departure.

For example, in step S60, in the first mode, the target resource may be determined according to any one of the relative distance, the angle of arrival, or the angle of departure, so as to obtain the target identification; or the target resource may also be determined by combining any two or three of the relative distance, the angle of arrival, and the angle of departure, so as to obtain the target identification. For example, in some examples, a candidate resource with a smallest relative distance may be determined as the target resource, or, a candidate resource with an angle of arrival or an angle of departure of approximately 90 degrees may be determined as the target resource. For example, in other examples, weighting factors may be assigned to the relative distance, the angle of arrival, and the angle of departure; and the relative distance, the angle of arrival and the angle of departure may be comprehensively considered, thereby determining the target resource. For example, in some other examples, firstly, screening is performed through the angle of arrival and the angle of departure; when the angles of arrival or the angles of departure between the requester and the plurality of candidate resources are relatively close to each other so that accurate judgment cannot be made through the angle of arrival and the angle of departure, the relative distances between the requester and the plurality of candidate resources are further judged, and the target resource is determined by comprehensively considering the two. Of course, the embodiments of the present disclosure are not limited thereto, and any applicable mode may be used to determine the target resource according to the relative distance, the angle of arrival, and the angle of departure, which may be determined according to actual needs.

Alternatively, in step S60, in the second mode, the plurality of pieces of relative location information may be sent to the general service entity; and the general service entity determines the target resource and the target identification.

Figure 19:
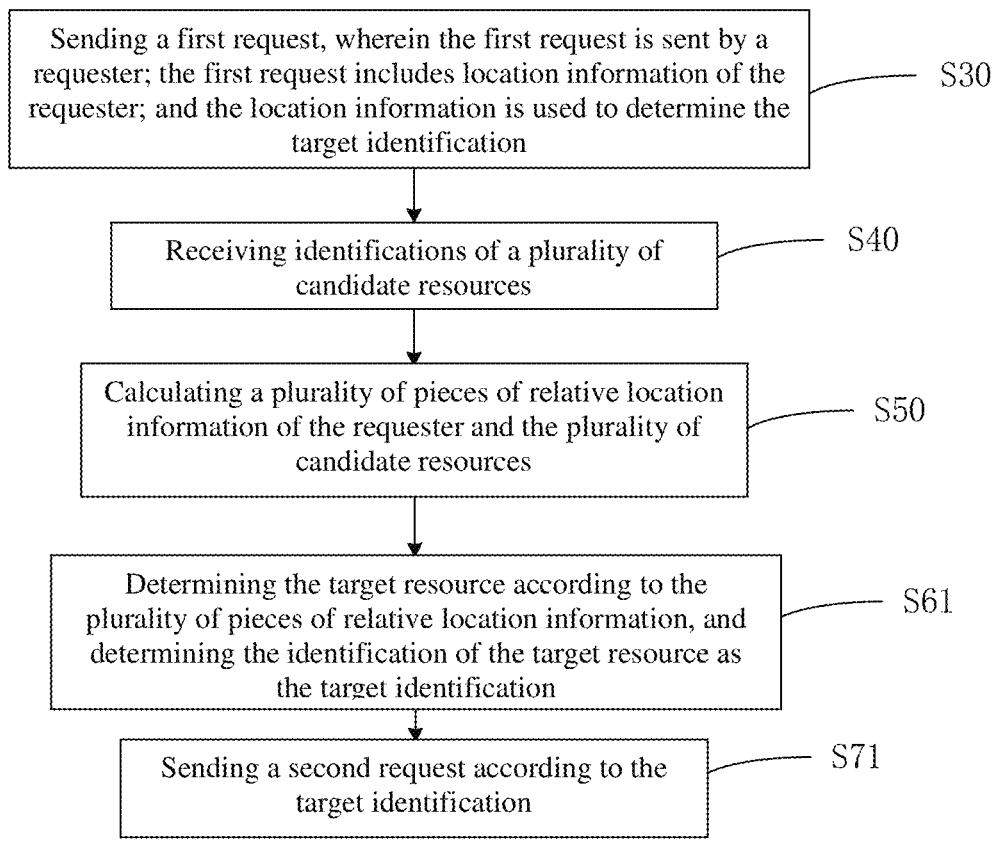
FIG. 19 is a schematic flow chart of another method for acquiring a target identification provided by some embodiments of the present disclosure.

For example, as shown in FIG. 19, when step S60 shown in FIG. 18 adopts the first mode, the method further includes operations below.

Step S61: determining the target resource according to the plurality of pieces of relative location information, and determining the identification of the target resource as the target identification; and step S71: sending a second request according to the target identification.

For example, step S61 is the first mode of step S60 shown in FIG. 18, and no details will be repeated here.

For example, in step S71, after the target identification is determined, the requester sends the second request to the general service entity, and the second request includes the target identification. For example, the second request may be a request that does not execute a specific action, such as an acquisition request; or the second request may also be an action request (e.g., an unlock request). For example, the second request sent by the requester may be an updated acquisition request, so that the target may be controlled or operated through the general service entity. For example, the second request sent by the requester may also be an updated action request, and the general service entity directly sends an action request to the target after receiving the second request, thereby directly controlling or operating the target.

Figure 20:
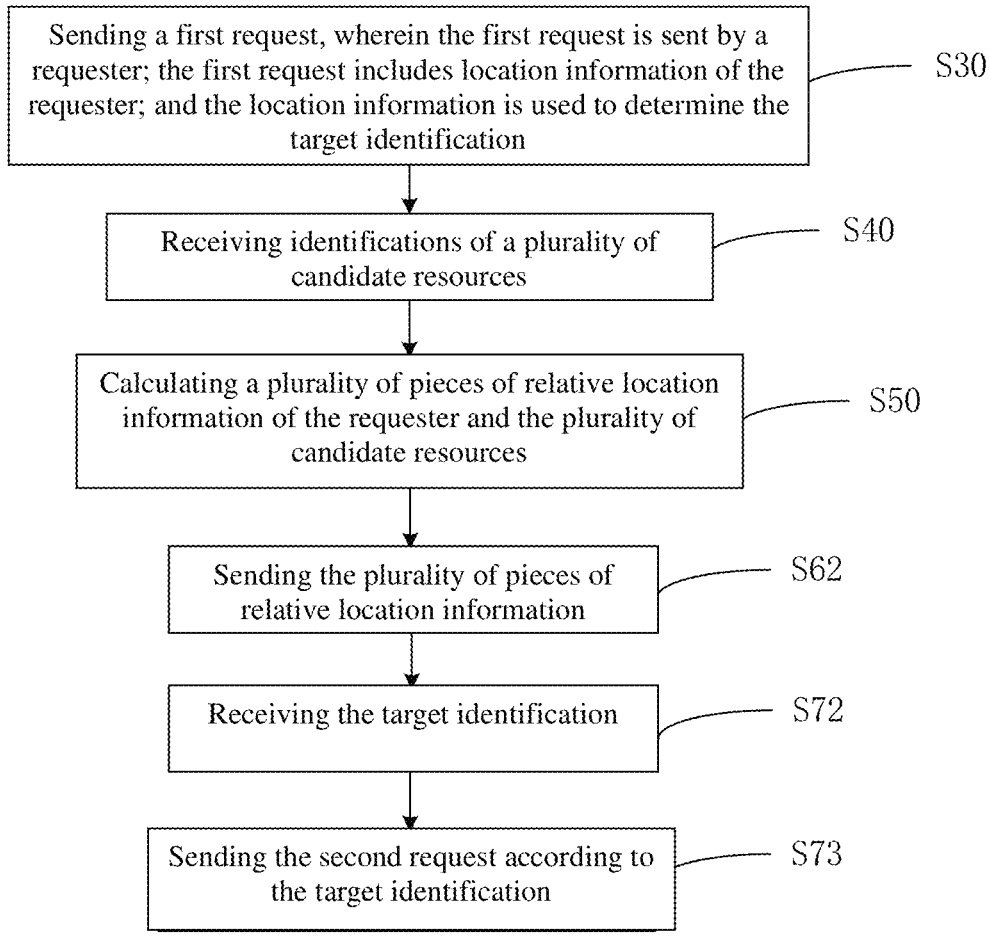
FIG. 20 is a schematic flow chart of still another method for acquiring a target identification provided by some embodiments of the present disclosure.

For example, as shown in FIG. 20, when step S60 shown in FIG. 18 adopts the second mode, the method further includes operations below.

Step S62: sending the plurality of pieces of relative location information;

step S72: receiving the target identification; and step S73: sending the second request according to the target identification.

For example, step S62 is the second mode of step S60 shown in FIG. 18, and no details will be repeated here.

For example, in step S72, the requester receives the target identification sent by the general service entity; and the target identification is determined by the general service entity according to the relative location information received by the general service entity.

For example, in step S73, after the target identification is determined, the requester sends the second request to the general service entity, and the second request includes the target identification. For relevant description of the second request, the above content may be referred to, and no details will be repeated here.

It should be noted that, in the embodiments of the present disclosure, after the identifications of the plurality of candidate resources are received, it is not limited to determining the target resource according to the relative location information, or the target resource may also be determined according to other information or parameters. For example, in at least one embodiment, after the identifications of the plurality of candidate resources are received, the target resource may be determined among the plurality of candidate resources according to a preset rule; and the identification of the target resource is determined as the target identification. For example, the preset rule may be determined according to actual needs, which is not limited by the embodiments of the present disclosure.

It should be noted that, for detailed description and technical effects of the method, the description of the method for acquiring the target identification in the embodiments shown in FIG. 5 to FIG. 16 may be referred to, and no details will be repeated here.

At least one embodiment of the present disclosure further provides an application entity. The application entity can acquire an identification of a target (i.e., a target identification) in the case where the identification of the target is damaged or partially damaged, so as to continue monitoring or controlling the target. The application entity provided by at least one embodiment may further reduce operation and maintenance costs of device management and help improve user experience.

Figure 21:
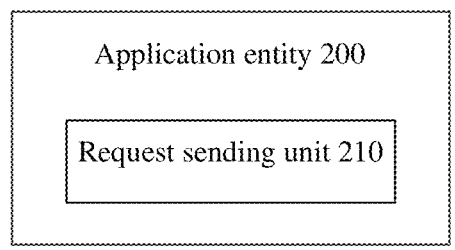
FIG. 21 is a schematic block diagram of an application entity provided by some embodiments of the present disclosure.

FIG. 21 is a schematic block diagram of an application entity provided by some embodiments of the present disclosure. As shown in FIG. 21, the application entity 200 includes a request sending unit 210.

For example, the request sending unit 210 is configured to send a first request. For example, the first request includes location information of the application entity 200; and the location information is used to determine a target identification. For example, the request sending unit 210 may execute step S30 of the method for acquiring the target identification shown in FIG. 18. For detailed description of the request sending unit 210, the above description of step S30 of the method for acquiring the target identification may be referred to, and no details will be repeated here.

It should be noted that, in the embodiments of the present disclosure, the request sending unit 210 may be hardware, software, firmware, and any feasible combination thereof. For example, the request sending unit 210 may be special or general purpose circuits, chips or apparatuses, etc., or may also be a combination of a processor and a memory, for example, the processor may be a central processing unit (CPU), a digital signal processor (DSP), etc., the memory may be any type of memory (e.g., flash memory, etc.), which stores computer-executable codes for implementing the function of sending a request, data for executing the computer-executable codes, and resulting data, etc. Specific implementation forms of the request sending unit 210 are not limited by the embodiments of the present disclosure.

It should be noted that, in the embodiments of the present disclosure, the application entity 200 may be the foregoing terminal device, or may also be a software module, an application program, etc. in the terminal device, which is not limited in the embodiments of the present disclosure. For detailed description and technical effects of the application entity 200, the above description of the method for acquiring the target identification may be referred to, and no details will be repeated here.

In conjunction with FIG. 22 to FIG. 26, the application flow of the method for acquiring the target identification provided by the embodiments of the present disclosure is exemplarily described below.

Figure 22:
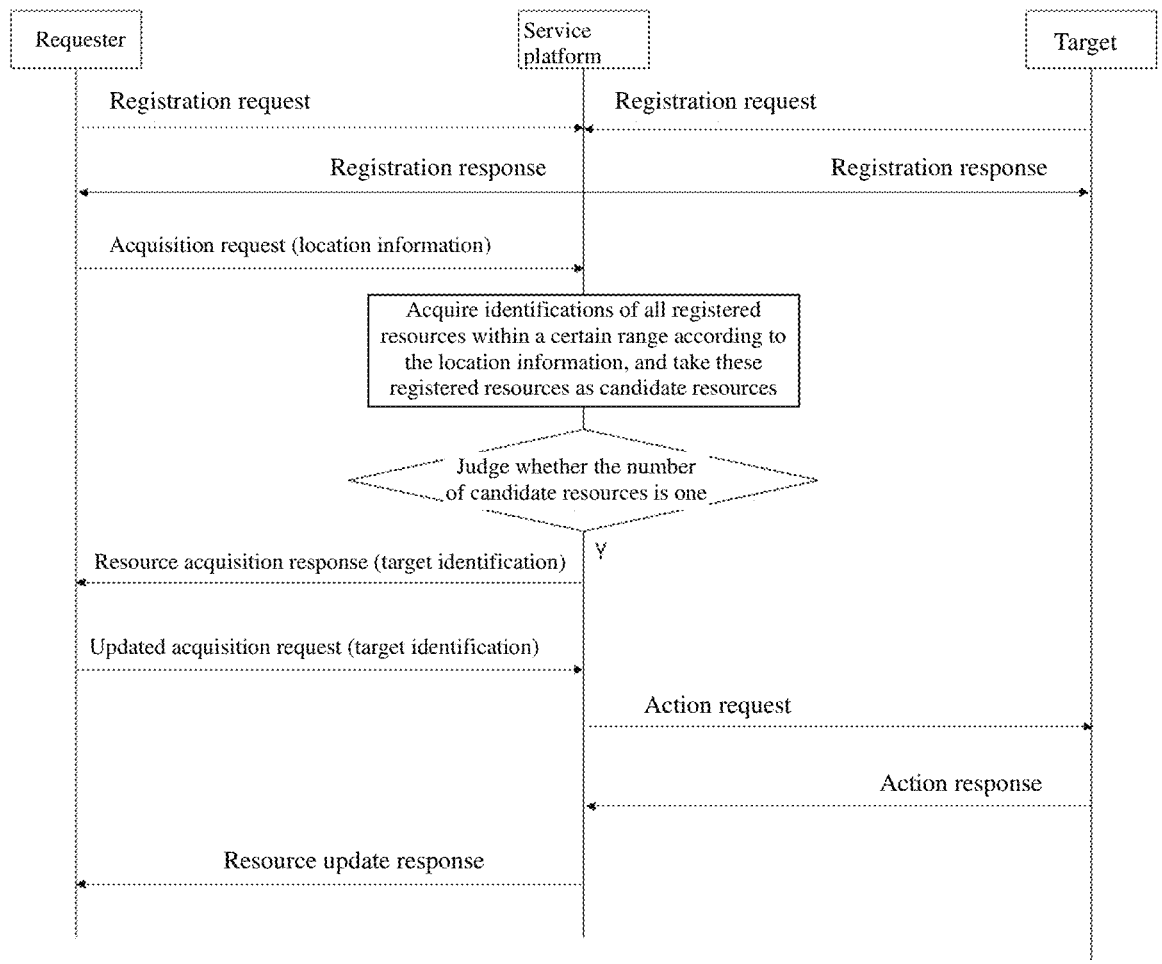
FIG. 22 is a schematic diagram I of an application flow of a method for acquiring a target identification provided by some embodiments of the present disclosure.

FIG. 22 is a schematic diagram I of an application flow of a method for acquiring a target identification provided by some embodiments of the present disclosure; and the application flow is based on, for example, a RESTFUL architecture.

As shown in FIG. 22, firstly, a requester sends a registration request to a service platform. The requester may be an application program or an application module, which may access the service platform to perform operations such as information acquisition and action triggering. After verifying the registration request, the service platform creates a virtual resource for the requester and sends a registration response to the requester. Similarly, a target sends a registration request to the service platform. The target may be an application program or an application module, which may access the service platform to perform operations such as information reporting and action execution. After verifying the registration request, the service platform creates a virtual resource for the target, and sends a registration response to the target. For example, the service platform assigns a unique identification to the target during registration.

When the requester needs to control the target, the requester sends an acquisition request to the service platform; the acquisition request includes location information of the requester; and the acquisition request is used to acquire a resource corresponding to the target. The service platform acquires identifications of all registered resources within a certain range (e.g., within 2 meters) in the vicinity of the requester according to the location information, and takes these registered resources as candidate resources. If the number of candidate resources is only one, the service platform determines the unique candidate resource as the target resource; and the identification of the target resource is the target identification. The service platform sends a resource acquisition response to the requester; and the resource acquisition response includes the target identification. After receiving the target identification, the requester sends an updated acquisition request to the service platform; the updated acquisition request includes the target identification; and the updated acquisition request is used to trigger an action request. Next, the service platform sends an action request to the target according to the target identification; and the target executes a corresponding action and sends an action response to the service platform. Finally, the service platform sends a resource update response to the requester, so as to notify the action response of the target to the requester. The application flow is, for example, applicable to the application scenario shown in FIG. 8.

Figure 23:
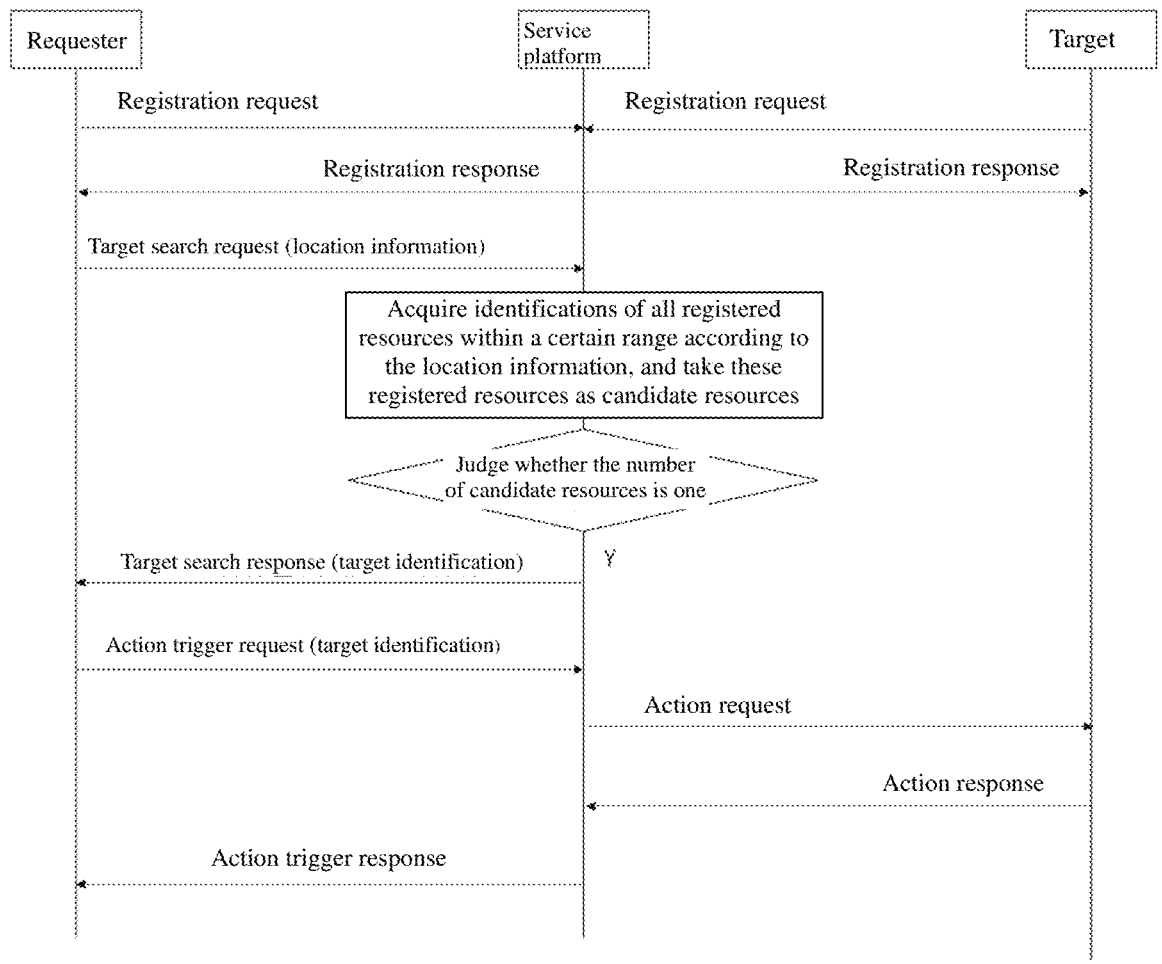
FIG. 23 is a schematic diagram II of an application flow of a method for acquiring a target identification provided by some embodiments of the present disclosure.

FIG. 23 is a schematic diagram II of an application flow of a method for acquiring a target identification provided by some embodiments of the present disclosure; and the application flow is based on, for example, an RPC architecture.

As shown in FIG. 23, firstly, a requester sends a registration request to a service platform. The requester may be an application program or an application module, which may access the service platform to perform operations such as information acquisition and action triggering. After verifying the registration request, the service platform creates a virtual resource for the requester and sends a registration response to the requester. Similarly, a target sends a registration request to the service platform. The target may be an application program or an application module, which may access the service platform to perform operations such as information reporting and action execution. After verifying the registration request, the service platform creates a virtual resource for the target, and sends a registration response to the target. For example, the service platform assigns a unique identification to the target during registration.

When the requester needs to control the target, the requester sends a target search request to the service platform. The target search request includes location information of the requester. The service platform acquires identifications of all registered resources within a certain range (e.g., within 2 meters) in the vicinity of the requester according to the location information, and takes these registered resources as candidate resources. If the number of candidate resources is only one, the service platform determines the unique candidate resource as a target resource; and the identification of the target resource is the target identification. The service platform sends a target search response to the requester; and the target search response includes the target identification. After receiving the target identification, the requester sends an action trigger request to the service platform; and the action trigger request includes the target identification. Next, the service platform sends an action request to the target according to the target identification; and the target executes a corresponding action and sends an action response to the service platform. Finally, the service platform sends an action trigger response to the requester, so as to notify the action response of the target to the requester. The application flow is, for example, applicable to the application scenario shown in FIG. 8.

Figure 24:
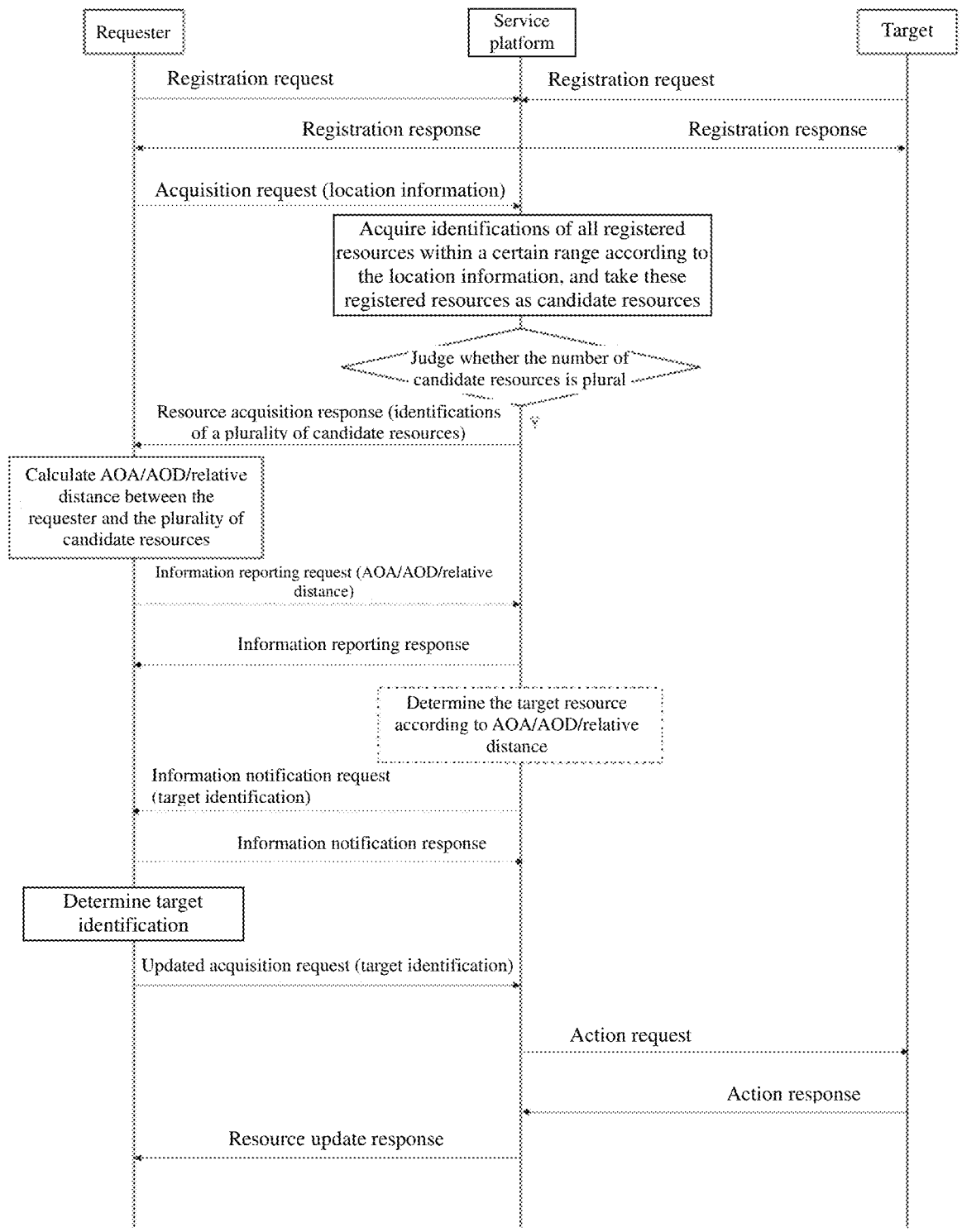
FIG. 24 is a schematic diagram III of an application flow of a method for acquiring a target identification provided by some embodiments of the present disclosure.

FIG. 24 is a schematic diagram III of an application flow of a method for acquiring a target identification provided by some embodiments of the present disclosure; and the application flow is based on, for example, a RESTFUL architecture.

As shown in FIG. 24, firstly, a requester sends a registration request to a service platform. The requester may be an application program or an application module, which may access the service platform to perform operations such as information acquisition and action triggering. After verifying the registration request, the service platform creates a virtual resource for the requester and sends a registration response to the requester. Similarly, a target sends a registration request to the service platform. The target may be an application program or an application module, which may access the service platform to perform operations such as information reporting and action execution. After verifying the registration request, the service platform creates a virtual resource for the target, and sends a registration response to the target. For example, the service platform assigns a unique identification to the target during registration.

When the requester needs to control the target, the requester sends an acquisition request to the service platform; the acquisition request includes location information of the requester; and the acquisition request is used to acquire a resource corresponding to the target. The service platform acquires identifications of all registered resources within a certain range (e.g., within 2 meters) in the vicinity of the requester according to the location information, and takes these registered resources as candidate resources. If the number of candidate resources is plural, the service platform sends a resource acquisition response to the requester, and the resource acquisition response includes the identifications of the plurality of candidate resources. The requester calculates relative location information of the requester itself and the plurality of candidate resources according to the identifications of the plurality of candidate resources, for example, one or more of the angle of arrival, the angle of departure, and the relative distance.

Then, in the first mode, the requester determines a target resource according to the relative location information, and determines the identification of the target resource as the target identification. Or, in the second mode, the requester sends an information reporting request to the service platform, and the information reporting request includes the relative location information calculated by the requester; the service platform sends an information reporting response to the requester; the service platform determines the target resource according to the relative location information and determines the identification of the target resource as the target identification; the service platform sends an information notification request to the requester, and the information notification request includes the target identification; and the requester sends an information notification response to the service platform.

Next, the requester sends an updated acquisition request to the service platform, the updated acquisition request includes the target identification, and the updated acquisition request is used to trigger an action request. The service platform sends an action request to the target according to the target identification; and the target executes a corresponding action and sends an action response to the service platform. Finally, the service platform sends a resource update response to the requester, so as to notify the action response of the target to the requester. The application flow is, for example, applicable to the application scenario shown in FIG. 12.

Figure 25:
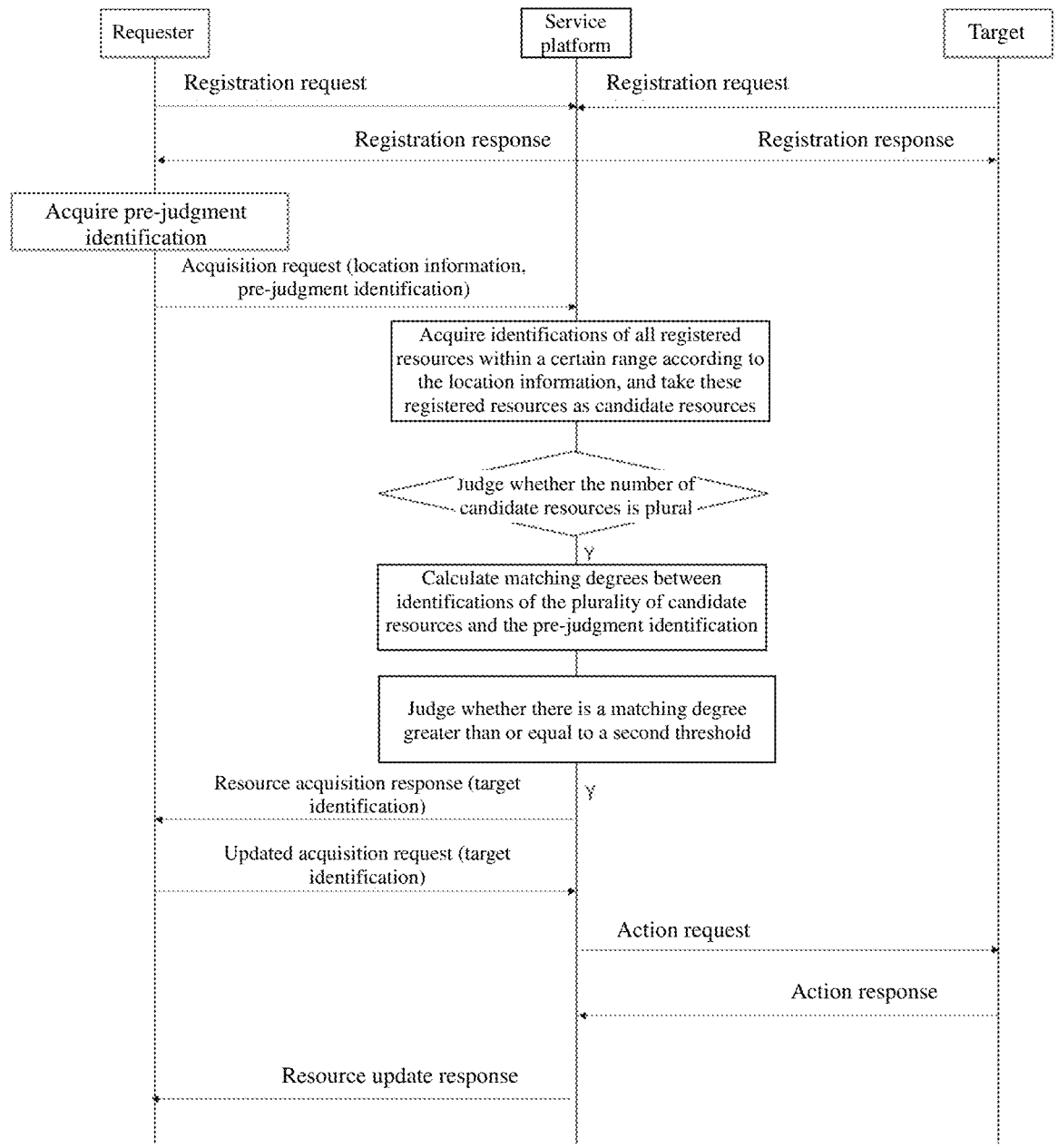
FIG. 25 is a schematic diagram IV of an application flow of a method for acquiring a target identification provided by some embodiments of the present disclosure.

FIG. 25 is a schematic diagram IV of an application flow of a method for acquiring a target identification provided by some embodiments of the present disclosure; and the application flow is based on, for example, a RESTFUL architecture.

As shown in FIG. 25, firstly, a requester sends a registration request to a service platform. The requester may be an application program or an application module, which may access the service platform to perform operations such as information acquisition and action triggering. After verifying the registration request, the service platform creates a virtual resource for the requester and sends a registration response to the requester. Similarly, a target sends a registration request to the service platform. The target may be an application program or an application module, which may access the service platform to perform operations such as information reporting and action execution. After verifying the registration request, the service platform creates a virtual resource for the target, and sends a registration response to the target. For example, the service platform assigns a unique identification to the target during registration.

When the requester needs to control the target, the requester firstly acquires a pre-judgment identification, for example, by scanning a two-dimensional code, a barcode, or manual input. Next, the requester sends an acquisition request to the service platform, the acquisition request includes location information of the requester and the pre-judgment identification, and the acquisition request is used to acquire a resource corresponding to the target. The service platform acquires identifications of all registered resources within a certain range (e.g., within 2 meters) in the vicinity of the requester according to the location information, and takes these registered resources as candidate resources.

If the number of candidate resources is plural, the service platform calculates matching degrees between identifications of the plurality of candidate resources and the pre-judgment identification, and judges whether there is a matching degree greater than or equal to a second threshold. If there is a matching degree greater than or equal to the second threshold, a candidate resource corresponding to a greatest matching degree is determined as a target resource; and an identification of the target resource is determined as a target identification. Next, the service platform sends a resource acquisition response to the requester, and the resource acquisition response includes the target identification. Next, the requester sends an updated acquisition request to the service platform, the updated acquisition request includes the target identification, and the updated acquisition request is used to trigger an action request. The service platform sends an action request to the target according to the target identification; and the target executes a corresponding action and sends an action response to the service platform. Finally, the service platform sends a resource update response to the requester, so as to notify the action response of the target to the requester. The application flow is, for example, applicable to the application scenario shown in FIG. 15.

Figure 26:
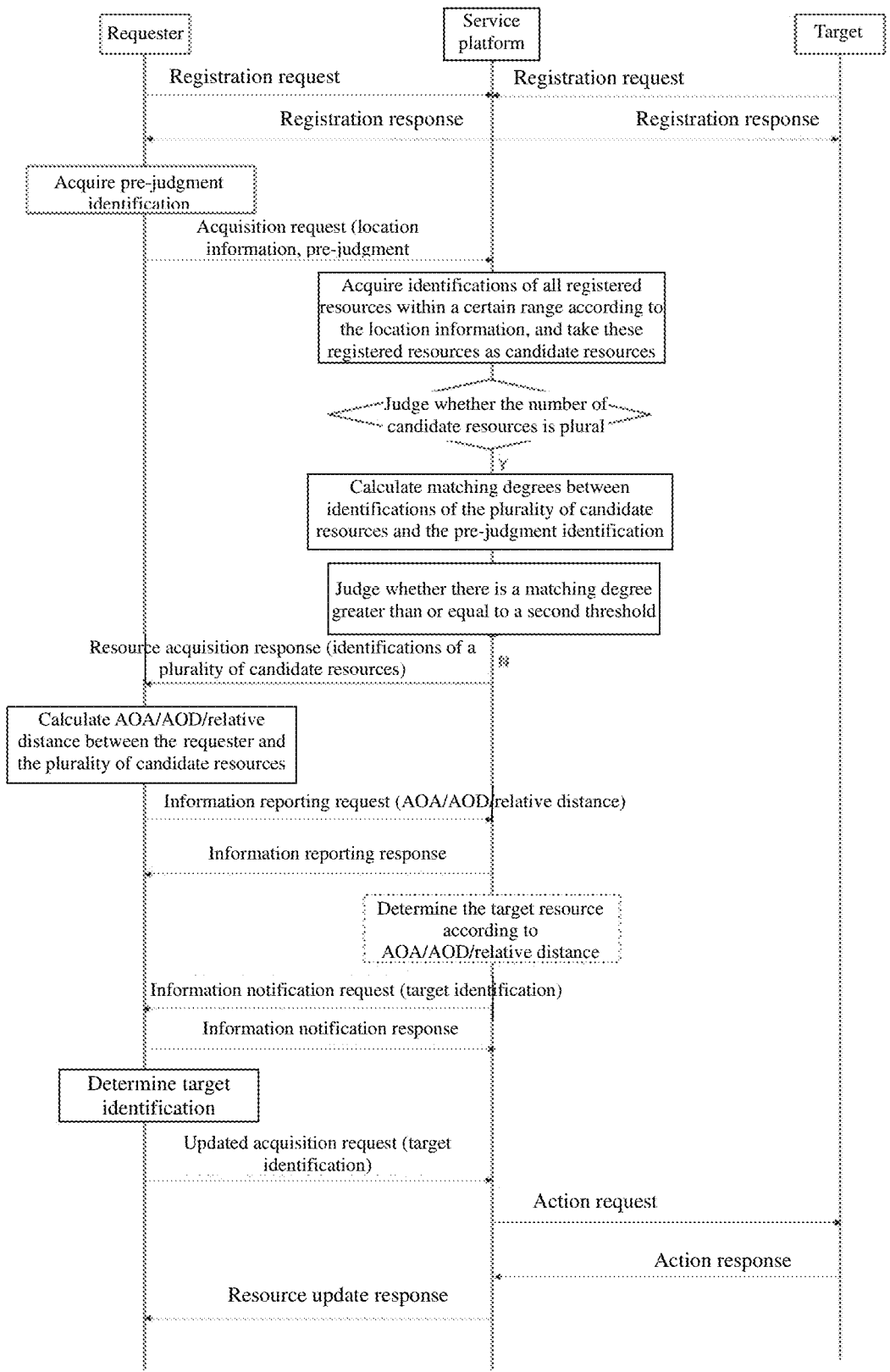
FIG. 26 is a schematic diagram V of an application flow of a method for acquiring a target identification provided by some embodiments of the present disclosure.

FIG. 26 is a schematic diagram V of an application flow of a method for acquiring a target identification provided by some embodiments of the present disclosure; and the application flow is based on, for example, a RESTFUL architecture.

As shown in FIG. 26, firstly, a requester sends a registration request to a service platform. The requester may be an application program or an application module, which may access the service platform to perform operations such as information acquisition and action triggering. After verifying the registration request, the service platform creates a virtual resource for the requester, and sends a registration response to the requester. Similarly, a target sends a registration request to the service platform. The target may be an application program or an application module, which may access the service platform to perform operations such as information reporting and action execution. After verifying the registration request, the service platform creates a virtual resource for the target, and sends a registration response to the target. For example, the service platform assigns a unique identification to the target during registration.

When the requester needs to control the target, the requester firstly acquires a pre-judgment identification, for example, by scanning a two-dimensional code, a barcode, or manual input. Next, the requester sends an acquisition request to the service platform, the acquisition request includes location information of the requester and the pre-judgment identification, and the acquisition request is used to acquire a resource corresponding to the target. The service platform acquires identifications of all registered resources within a certain range (e.g., within 2 meters) in the vicinity of the requester according to the location information, and takes these registered resources as candidate resources.

If the number of candidate resources is plural, the service platform calculates matching degrees between identifications of the plurality of candidate resources and the pre-judgment identification, and judges whether there is a matching degree greater than or equal to a second threshold. If there is no matching degree greater than or equal to the second threshold, the service platform sends a resource acquisition response to the requester, and the resource acquisition response includes the identifications of the plurality of candidate resources. The requester calculates relative location information of the requester itself and the plurality of candidate resources according to the identifications of the plurality of candidate resources, for example, one or more of the angle of arrival, the angle of departure, and the relative distance.

Then, in the first mode, the requester determines a target resource according to the relative location information, and determines an identification of the target resource as the target identification. Or, in the second mode, the requester sends an information reporting request to the service platform, and the information reporting request includes the relative location information calculated by the requester; the service platform sends an information reporting response to the requester; the service platform determines the target resource according to the relative location information and determines the identification of the target resource as the target identification; the service platform sends an information notification request to the requester, and the information notification request includes the target identification; and the requester sends an information notification response to the service platform.

Next, the requester sends an updated acquisition request to the service platform, the updated acquisition request includes the target identification, and the updated acquisition request is used to trigger an action request. The service platform sends an action request to the target according to the target identification; and the target executes a corresponding action and sends an action response to the service platform. Finally, the service platform sends a resource update response to the requester, so as to notify the action response of the target to the requester. The application flow is, for example, applicable to the application scenario shown in FIG. 16.

At least one embodiment of the present disclosure further provides an electronic apparatus; and the electronic apparatus includes a processor and a memory. The memory includes one or more computer program modules. The one or more computer program modules are stored in the memory and configured to be executed by the processor; and the one or more computer program modules include instructions for implementing the method for acquiring the target identification according to any one embodiment of the present disclosure. The electronic apparatus can acquire an identification of a target (i.e., a target identification) in the case where the identification of the target is damaged or partially damaged, so as to continue monitoring or controlling the target. The electronic apparatus provided by at least one embodiment may further reduce operation and maintenance costs of device management and help improve user experience.

Figure 27:
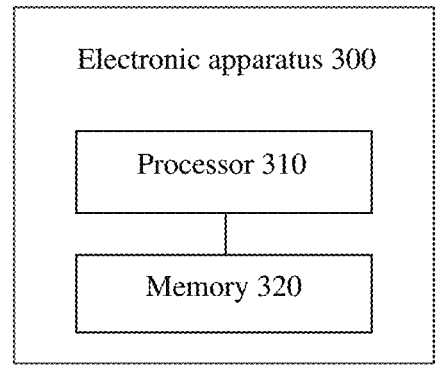
FIG. 27 is a schematic block diagram of an electronic apparatus provided by some embodiments of the present disclosure.

FIG. 27 is a schematic block diagram of an electronic apparatus provided by some embodiments of the present disclosure. As shown in FIG. 27, the electronic apparatus 300 includes a processor 310 and a memory 320. The memory 320 is configured to store non-transitory computer readable instructions (e.g., one or more computer program modules). The processor 310 is configured to execute non-transitory computer-readable instructions; and the non-transitory computer-readable instructions, when run by the processor 310, may execute one or more steps of the above-described method for acquiring the target identification. The memory 320 and the processor 310 may be interconnected by a bus system and/or other form of connection mechanism (not shown).

For example, the memory 320 and the processor 310 may be provided on a user terminal, for example, provided on the foregoing user terminal 30, for executing one or more steps of the method for acquiring the target identification as described in FIG. 18 to FIG. 20. For example, the memory 320 and the processor 310 may also be provided on the server side (or the cloud), for example, provided on the foregoing cloud server 20, for executing one or more steps of the method for acquiring the target identification as described in FIG. 5 to FIG. 7, FIG. 10 to FIG. 11, and FIG. 13 to FIG. 14.

For example, the processor 310 may be a central processing unit (CPU), a graphics processing unit (GPU), or other form of processing unit having a data processing capability and/or a program execution capability, for example, a field programmable gate array (FPGA), etc.; for example, the central processing unit (CPU) may be an X86 or ARM architecture. The processor 310 may be a general purpose processor or a special purpose processor, and may control other components in the electronic apparatus 300 to execute desired functions.

For example, the memory 320 may include any combination of one or more computer program products; and the computer program products may include various forms of computer readable storage media, for example, a volatile memory and/or a non-volatile memory. The volatile memory may include, for example, a random access memory (RAM) and/or a cache, or the like. The non-volatile memory may include, for example, a read only memory (ROM), a hard disk, an erasable programmable read only memory (EPROM), a portable compact disk read only memory (CD-ROM), a USB memory, a flash memory, or the like. One or more computer program modules may be stored on the computer readable storage medium, and the processor 310 may run the one or more computer program modules, to implement various functions of the electronic apparatus 300. Various applications and various data, as well as various data used and/or generated by the applications may also be stored on the computer readable storage medium. For specific functions and technical effects of the electronic apparatus 300, the above description of the method for acquiring the target identification may be referred to, and no details will be repeated here.

At least one embodiment of the present disclosure further provides a storage medium, which is configured to store non-transitory computer-readable instructions, and the non-transitory computer-readable instructions, when executed by a computer, may implement the method for acquiring the target identification according to any one embodiment of the present disclosure. By using the storage medium, an identification of a target (i.e., a target identification) can be acquired in the case where the identification of the target is damaged or partially damaged, so as to continue monitoring or controlling the target. The storage medium provided by at least one embodiment may further reduce operation and maintenance costs of device management and help improve user experience.

Figure 28:
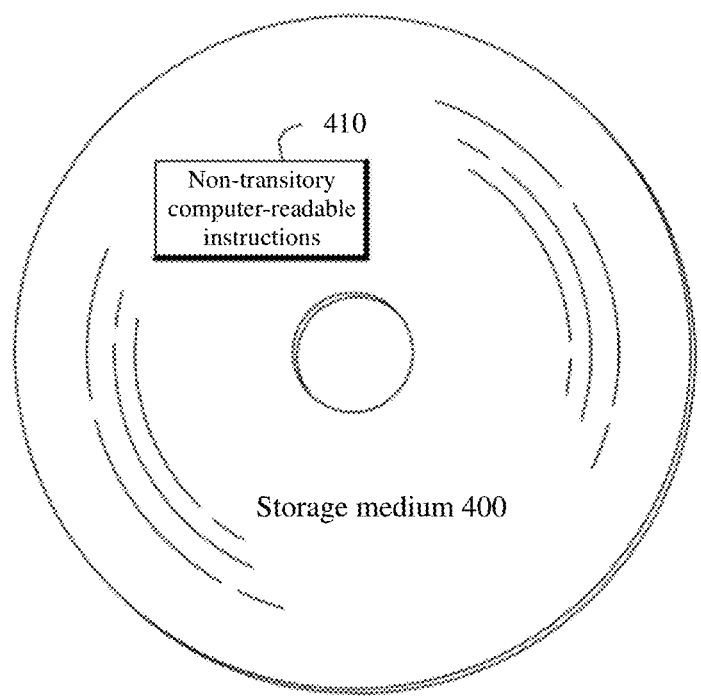
FIG. 28 is a schematic diagram of a storage medium provided by some embodiments of the present disclosure.

FIG. 28 is a schematic diagram of a storage medium provided by some embodiments of the present disclosure. As shown in FIG. 28, the storage medium 400 is configured to store non-transitory computer readable instructions 410. For example, the non-transitory computer-readable instructions 410, when executed by a computer, may execute one or more steps of the method for acquiring the target identification as described above.

For example, the storage medium 400 may be the memory 320 in the electronic apparatus 300 shown in FIG. 27. For example, for relevant description of the storage medium 400, corresponding description of the memory 320 in the electronic apparatus 300 shown in FIG. 27 may be referred to, and no details will be repeated here.

The following statements should be noted.

(1) The accompanying drawings involve only the structure(s) in connection with the embodiment(s) of the present disclosure, and other structure(s) can be referred to common design(s).

(2) In case of no conflict, features in one embodiment or in different embodiments can be combined to obtain new embodiments.

The above are only specific implementations of the present disclosure, but the protection scope of the present disclosure is not limited thereto. The protection scope of the present disclosure should be based on the protection scope of the claims.

What is claimed is:

1. A method for acquiring a target identification, applied to Internet of Things, wherein the method comprises:
receiving a first request, wherein the first request is sent by a requester, the requester is a mobile terminal device, and the first request comprises location information of the requester; and
determining the target identification according to the location information, wherein the target identification is an identification of a target, and the target is a terminal device or a node device in the Internet of Things;
wherein determining the target identification according to the location information comprises:
determining at least one candidate resource according to the location information; and
determining a target resource based on the at least one candidate resource, and determining an identification of the target resource as the target identification;
wherein the at least one candidate resource comprises a plurality of candidate resources,
determining the target resource based on the at least one candidate resource, and determining the identification of the target resource as the target identification, comprises:
sending identifications of the plurality of candidate resources to the requester; and
receiving the target identification sent by the requester;
or, determining the target resource based on the at least one candidate resource, and determining the identification of the target resource as the target identification, comprises:
sending identifications of the plurality of candidate resources to the requester;
receiving a plurality of pieces of relative location information sent by the requester and corresponding to the plurality of candidate resources; and
determining the target resource based on the plurality of pieces of relative location information, and determining the identification of the target resource as the target identification.

2. The method according to claim 1, wherein determining the at least one candidate resource according to the location information comprises:
calculating a target region according to the location information; and
determining at least one registered resource in the target region as the candidate resource.

3. The method according to claim 2, wherein the target region comprises a plurality of target coordinate points, and distances between the plurality of target coordinate points and a coordinate point corresponding to the location information are less than or equal to a first threshold.

4. The method according to claim 1, wherein the first request further comprises a pre-judgment identification that is a portion identification relative to the target identification,
determining the target resource based on the at least one candidate resource, and determining the identification of the target resource as the target identification, further comprises:
calculating matching degrees between identifications of the plurality of candidate resources and the pre-judgment identification to obtain a plurality of matching degrees; and
determining the target resource based on the plurality of matching degrees, and determining the identification of the target resource as the target identification.

5. The method according to claim 4, wherein determining the target resource based on the plurality of matching degrees, and determining the identification of the target resource as the target identification, comprises:
in a case where there is at least one matching degree greater than or equal to a second threshold among the plurality of matching degrees, determining a candidate resource corresponding to a greatest matching degree among the at least one matching degree greater than or equal to the second threshold as the target resource, and determining the identification of the target resource as the target identification.

6. The method according to claim 4, wherein determining the target resource based on the plurality of matching degrees, and determining the identification of the target resource as the target identification, comprises:
in a case where the plurality of matching degrees are all less than a second threshold, sending the identifications of the plurality of candidate resources to the requester; and
receiving the target identification sent by the requester.

7. The method according to claim 4, wherein determining the target resource based on the plurality of matching degrees, and determining the identification of the target resource as the target identification, comprises:
in a case where the plurality of matching degrees are all less than a second threshold, sending the identifications of the plurality of candidate resources to the requester;
receiving a plurality of pieces of relative location information sent by the requester and corresponding to the plurality of candidate resources; and
determining the target resource based on the plurality of pieces of relative location information, and determining the identification of the target resource as the target identification.

8. The method according to claim 1, wherein the relative location information comprises at least one of a relative distance of the requester and the candidate resource, an angle of arrival, or an angle of departure.

9. An electronic apparatus, comprising:
a processor; and
a memory, comprising one or more computer program modules,
wherein the one or more computer program modules are stored in the memory and configured to be executed by the processor, and the one or more computer program modules comprise instructions for implementing the method for acquiring the target identification according to claim 1.

10. A non-transitory storage medium, configured to store computer-readable instructions, wherein the computer-readable instructions, when executed by a computer, implement the method for acquiring the target identification according to claim 1.

11. A service entity applied to Internet of Things, comprising:
a request receiving unit, configured to receive a first request, wherein the first request is sent by a requester, the requester is a mobile terminal device, and the first request comprises location information of the requester; and
an identification determining unit, configured to determine a target identification according to the location information, wherein the target identification is an identification of a target, and the target is a terminal device or a node device in the Internet of Things;

wherein determining the target identification according to the location information comprises:

determining at least one candidate resource according to the location information; and determining a target resource based on the at least one candidate resource, and determining an identification of the target resource as the target identification;

wherein the at least one candidate resource comprises a plurality of candidate resources, determining the target resource based on the at least one candidate resource, and determining the identification of the target resource as the target identification, comprises:

sending identifications of the plurality of candidate resources to the requester; and receiving the target identification sent by the requester;

or, determining the target resource based on the at least one candidate resource, and determining the identification of the target resource as the target identification, comprises:

sending identifications of the plurality of candidate resources to the requester;

receiving a plurality of pieces of relative location information sent by the requester and corresponding to the plurality of candidate resources; and determining the target resource based on the plurality of pieces of relative location information, and determining the identification of the target resource as the target identification.

12. A method for acquiring a target identification, applied to Internet of Things, wherein the method comprises:

sending a first request, wherein the first request is sent by a requester, the requester is a mobile terminal device, the first request comprises location information of the requester, and the location information is used to determine the target identification, the target identification is an identification of a target, and the target is a terminal device or a node device in the Internet of Things;

the method further comprises:

receiving identifications of a plurality of candidate resources;

calculating a plurality of pieces of relative location information of the requester and the plurality of candidate resources; and determining a target resource according to the plurality of pieces of relative location information, and determining an identification of the target resource as the target identification, or, sending the plurality of pieces of relative location information.

13. The method according to claim 12, wherein after determining the target resource according to the plurality of pieces of relative location information and determining the identification of the target resource as the target identification, the method further comprises:

sending a second request according to the target identification.

14. The method according to claim 12, wherein after sending the plurality of pieces of relative location information, the method further comprises:

receiving the target identification; and sending a second request according to the target identification.

* * * * *